United States Patent
Nunney et al.

(10) Patent No.: US 10,816,476 B2
(45) Date of Patent: Oct. 27, 2020

(54) XPS AND RAMAN SAMPLE ANALYSIS SYSTEM AND METHOD

(71) Applicants: VG SYSTEMS LIMITED, Altrincham (GB); THERMO ELECTRON SCIENTIFIC INSTRUMENTS LLC, Madison, WI (US)

(72) Inventors: Timothy Sion Nunney, Reigate (GB); Christopher Kenneth Glenister, Lewes (GB); Matthew Wayne Meyer, Madison, WI (US); Noah Hibbard, Milwaukee, WI (US)

(73) Assignees: VG SYSTEMS LIMITED, Altrincharn (GB); THERMO ELECTRON SCIENTIFIC INSTRUMENTS LLC, Madison, WI (US)

( * ) Notice: Subject to any disclaimer, the term of this patent is extended or adjusted under 35 U.S.C. 154(b) by 77 days.

(21) Appl. No.: 16/081,622

(22) PCT Filed: Feb. 8, 2017

(86) PCT No.: PCT/EP2017/052757
§ 371 (c)(1),
(2) Date: Aug. 31, 2018

(87) PCT Pub. No.: WO2017/148668
PCT Pub. Date: Sep. 8, 2017

(65) Prior Publication Data
US 2019/0285548 A1  Sep. 19, 2019

Related U.S. Application Data

(60) Provisional application No. 62/303,528, filed on Mar. 4, 2016.

(51) Int. Cl.
*G01N 21/65* (2006.01)
*G01J 3/02* (2006.01)
(Continued)

(52) U.S. Cl.
CPC ............ *G01N 21/65* (2013.01); *G01J 3/0286* (2013.01); *G01J 3/0291* (2013.01); *G01J 3/40* (2013.01);
(Continued)

(58) Field of Classification Search
None
See application file for complete search history.

(56) References Cited

U.S. PATENT DOCUMENTS

| | | | | |
|---|---|---|---|---|
| 5,220,169 A | * | 6/1993 | Ninomiya | G01N 23/22 250/358.1 |
| 6,333,784 B1 | * | 12/2001 | Blasi | G01J 3/44 356/301 |

(Continued)

FOREIGN PATENT DOCUMENTS

| | | |
|---|---|---|
| DE | 102014205660 A1 | 10/2015 |
| JP | 2000304713 | 2/2000 |
| JP | 2002228609 A | 8/2002 |

OTHER PUBLICATIONS

Bocchetta et al., "Morphochemical evolution during ageing of pyrolysed Mn/polypyrrole nanocomposite oxygen reduction electrocatalysts: A study based on quasi-in situ photoelectron spectromicroscopy," J. of Electroanalytical Chemistry, 758, 191-200, 2015.
(Continued)

*Primary Examiner* — Shawn Decenzo
(74) *Attorney, Agent, or Firm* — William R. McCarthy, III

(57) ABSTRACT

A process of analyzing a sample by Raman spectroscopy and X-ray photoelectron spectroscopy (XPS) includes providing a sample having a sample surface within a vacuum chamber, performing a Raman spectroscopic analysis on a plurality of selected areas of the sample surface within the vacuum chamber to map an area of the sample surface comprising
(Continued)

the selected areas, the Raman spectroscopic analysis including identifying one or more face in one or more of the selected areas of the sample surface, and performing an X-ray photoelectron spectroscopy (XPS) analysis of one or more selected areas of the sample surface containing at least one chemical and/or structural feature identified by the Raman spectroscopic analysis, wherein the duration of the XPS analysis of a given selected area of the sample surface is longer than the duration of the Raman spectroscopic analysis of that given selected area.

16 Claims, 18 Drawing Sheets

(51) Int. Cl.
| | | |
|---|---|---|
| | $G01J\ 3/40$ | (2006.01) |
| | $G01J\ 3/44$ | (2006.01) |
| | $G01N\ 21/47$ | (2006.01) |
| | $G01N\ 23/2273$ | (2018.01) |
| | $G01N\ 21/17$ | (2006.01) |

(52) U.S. Cl.
CPC .............. *G01J 3/44* (2013.01); *G01J 3/4412* (2013.01); *G01N 21/47* (2013.01); *G01N 23/2273* (2013.01); *G01N 2021/177* (2013.01); *G01N 2021/1734* (2013.01)

(56) References Cited

U.S. PATENT DOCUMENTS

| | | | |
|---|---|---|---|
| 2006/0023837 A1 | 2/2006 | He et al. | |
| 2009/0155934 A1* | 6/2009 | Nishimura | C23C 16/4586 438/14 |
| 2014/0035943 A1* | 2/2014 | Statham | G06T 11/001 345/593 |
| 2014/0212640 A1* | 7/2014 | Piazza | B82Y 30/00 428/206 |
| 2014/0255822 A1* | 9/2014 | Asefa | H01M 4/96 429/523 |
| 2015/0105284 A1* | 4/2015 | Willson | G01N 21/6428 506/9 |
| 2016/0222502 A1* | 8/2016 | Gondal | B01J 23/50 |
| 2016/0363538 A1 | 12/2016 | Dutertre et al. | |
| 2019/0120753 A1* | 4/2019 | Prater | G01N 23/207 |
| 2020/0025677 A1* | 1/2020 | Prater | G02B 21/0076 |

OTHER PUBLICATIONS

Kafizas et al., "Combinatorial CVD: New Oxynitride Photocatalysts," ECS Transactions, 25(4), 139-154, 2010.

Nottbohm et al., "Investigation of ceria by combined Raman, UV-vis and X-ray photoelectron spectroscopy," Catalysis Communications, 22, 39-42, 2012.

Nunney et al., "A multi-technique approach to the characterization of surfaces and thin films," Microsc. Microanal. 18 (Suppl 2), 890-891, 2012.

Pint et al., "Odako Growth of Dense Arrays of Single-Walled Carbon Nanotubes Attached to Carbon Surfaces," Nano Res, 2, 526-534, 2009.

Yilmaz et al., "Pohtopatteming of PMMA Films with Gold Nanoparticles: Diffusion of AuCL4-Ions," J. Phys. Chem. C, 114, 18401-18406, 2010.

* cited by examiner

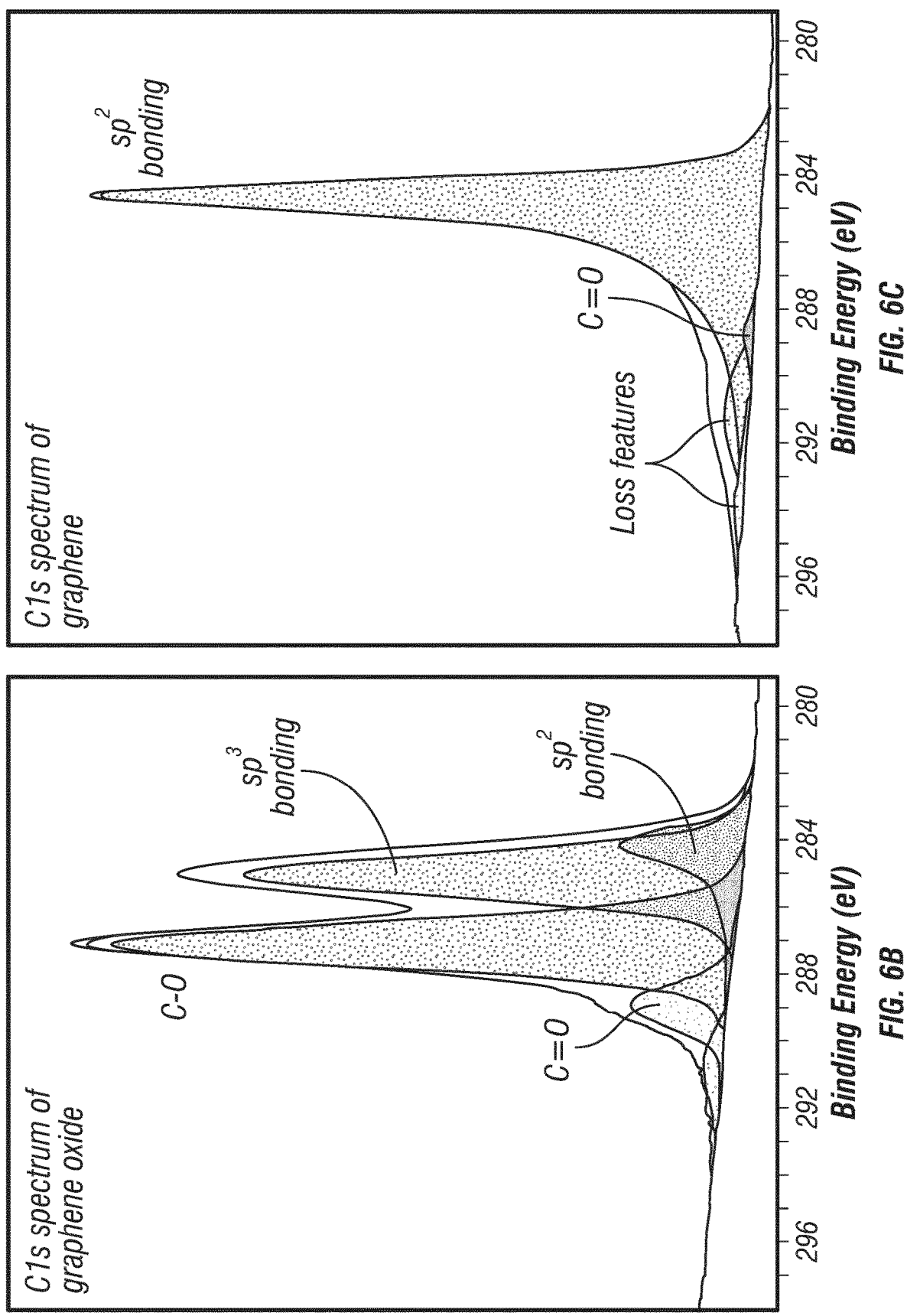

XPS AND RAMAN SAMPLE ANALYSIS SYSTEM AND METHOD

CROSS-REFERENCE TO RELATED APPLICATIONS

This application is the United States National Stage Application, under 35 USC 371, of International Application No. PCT/EP2017/052757 having an international filing date of Feb. 8, 2017 and designating the United States, which claims priority to U.S. provisional patent application No. 62/303,528, filed Mar. 4, 2016, said applications incorporated by reference herein in their entireties.

FIELD OF THE INVENTION

The invention is generally related to sample analysis by X-ray photoelectron spectroscopy (XPS) and Raman spectroscopy.

BACKGROUND

Raman spectroscopy and X-ray photoelectron spectroscopy (XPS) are both widely used techniques for the surface analysis of samples in academic, research and industrial applications. Raman spectroscopy is normally performed at atmospheric pressure in air. For optimum depth resolution performance, high magnification immersion objectives are preferred. XPS analysis is typically performed in ultra high vacuum (UHV). XPS also typically requires a clear access around the sample of about 30 mm.

To develop a complete analysis of samples, several techniques can be used to provide complementary information regarding the surface of the same sample, including among others XPS, Raman, EDX, SEM, SIMS, and AFM. Such measurements are normally performed in separate dedicated instruments, leading to difficulties in alignment of the features on the sample for analysis. Sample modification is also problematic, due to the time delay, and the atmospheric exposure involved in moving samples from one system to another. It is also not possible when using separate systems to simultaneously investigate the effects of surface treatments using a variety of deposition and surface modification techniques.

Therefore, there is a need for a combination of sample analysis techniques that reduces or eliminates the problems described above.

SUMMARY

In one embodiment, a process of analyzing a sample by Raman spectroscopy and X-ray photoelectron spectroscopy (XPS) includes providing a sample having a sample surface within a vacuum chamber, performing a Raman spectroscopic analysis on a plurality of selected areas of the sample surface within the vacuum chamber to map an area of the sample surface comprising the selected areas, the Raman spectroscopic analysis including identifying one or more chemical and/or structural features of the sample surface in one or more of the selected areas of the sample surface, and performing an X-ray photoelectron spectroscopy (XPS) analysis of one or more selected areas of the sample surface containing at least one chemical and/or structural feature identified by the Raman spectroscopic analysis, wherein the duration of the XPS analysis of a given selected area of the sample surface is longer than the duration of the Raman spectroscopic analysis of that given selected area of the sample surface. The duration of the XPS analysis of a given selected area of the sample surface can be at least 2 times, or 5 times, or 10 times, or 100 times longer than the duration of analysis of that given selected area of the sample surface by the Raman spectroscopic analysis. The overall duration of XPS analysis of a plurality of selected areas of the sample surface containing at least one chemical and/or structural feature identified by the Raman spectroscopic analysis to provide an XPS map of the surface can be longer than the overall duration of Raman mapping by Raman spectroscopic analysis of a plurality of selected areas of the sample surface, for example at least 2 times, or 5 times, or 10 times, or 100 times longer. In some embodiments, by performing XPS analysis for some but not all of the selected areas that were analyzed by Raman spectroscopic analysis the overall analysis time can be reduced. For example, in this way, if the duration of the XPS analysis of a given selected area of the sample surface is x times longer than the duration of analysis of that given selected area of the sample surface by the Raman spectroscopic analysis, the overall duration of XPS analysis may be longer than the overall duration of Raman spectroscopic analysis but by a factor less than x. In some embodiments, a laser beam spot for the Raman spectroscopic analysis and an X-ray beam spot for the XPS analysis can be substantially co-aligned (i.e., co-incident) at the sample surface. In certain embodiments, the laser beam spot for the Raman spectroscopic analysis and an X-ray beam spot for the XPS analysis can be precisely coincident. This is useful for improved resolution and/or image registration of Raman and XPS images. In some embodiments, the laser beam spot for the Raman spectroscopic analysis and the X-ray beam spot are aligned within an alignment tolerance of about 10 microns, such as about 5 microns. In these embodiments, the laser beam spot for the Raman spectroscopic analysis and the X-ray beam spot for the XPS analysis each can be less than about 20 microns in diameter at the sample surface, such as less than about 15 microns in diameter at the sample surface. In certain embodiments, a laser beam for the Raman spectroscopic analysis and an X-ray beam for the XPS analysis can be focused to substantially the same size at the sample surface.

In some embodiments, the XPS analysis can include a quantitative analysis of one or more species present on the sample surface. In certain embodiments, the XPS analysis can include measuring at least one of an $sp^2$ and $sp^3$ carbon composition of the sample. In some embodiments, the sample can include a material selected from the group consisting of: inorganic material, organic material, metal oxide material, polymer material, carbon containing material, semiconductor material, silicon carbide, graphite, diamond, graphene, carbon nanotubes, and single walled carbon nanotubes. In certain embodiments, the Raman spectroscopic analysis can include identifying and characterizing carbon nanotubes in the sample by determining characteristics of at least one of a Raman G band, a Raman D band and a carbon nanotube radial breathing mode (RBM). In these embodiments, the analysis can include comparing relative spectral positions and/or intensities of at least two of: a Raman G band, Raman D band and RBM band present from the Raman spectroscopic analysis. The analysis can further include obtaining a ratio between a Raman G band and a Raman D band, such as a Raman 1D band and a Raman 2D band, to identify single walled carbon nanotubes. In some embodiments, the analysis can further include measuring at least one frequency of a radial breathing mode to obtain at least one diameter of a carbon nanotube.

In another embodiment, a process of analyzing surface layers using Raman spectroscopy and X-ray photoelectron spectroscopy (XPS) includes providing a sample having a sample surface within a vacuum chamber, the sample surface comprising a surface layer on a substrate, performing a Raman spectroscopic analysis on a selected area of the sample surface comprising the surface layer on the substrate within the vacuum chamber, bombarding the selected area of the sample surface with ions in one or more stages to remove the surface layer from the selected area, performing an XPS analysis on the selected area of the sample surface after each of the one or more stages of bombarding the selected area of the sample surface with ions to determine if the surface layer has been removed, performing a Raman spectroscopic analysis on the selected area of the sample surface after the surface layer has been removed as determined by the XPS analysis, and determining a difference between results of the Raman spectroscopic analysis before the surface layer has been removed and results of the Raman spectroscopic analysis after the surface layer has been removed. The process can further include no longer bombarding the selected area of the sample surface with ions after the XPS analysis indicates that the surface layer has been removed. In some embodiments, the process can further include (i) subtracting results of the Raman spectroscopic analysis after the surface layer has been removed from results of the Raman spectroscopic analysis before the surface layer has been removed, or (ii) subtracting results of the Raman spectroscopic analysis before the surface layer has been removed from results of the Raman spectroscopic analysis after the surface layer has been removed. In certain embodiments, the ions can be cluster ions, such as argon cluster ions. In certain embodiments, the surface layer can be a thin film, such as a deposited thin film. The surface layer can have a thickness in a range inclusive of between 0.3 nm and 5 micron ($\mu$m), such as 0.5 nm, 1 nm, 1.5 nm, 2 nm, 3 nm, 4 nm, 5 nm, 10 nm, 15 nm, 20 nm, 25 nm, 30 nm, 35 nm, 40 nm, 45 nm, 50 nm, 100 nm, 150 nm, 200 nm, 250 nm, 300 nm, 350 nm, 400 nm, 450 nm, 500 nm, 1 $\mu$m, 1.5 $\mu$m, 2 $\mu$m, 2.5 $\mu$m, 3 $\mu$m, 3.5 $\mu$m, 4 $\mu$m, and 4.5 $\mu$m. In some embodiments, a laser beam spot for the Raman spectroscopic analysis and an X-ray beam spot for the XPS analysis can be substantially co-aligned at the sample surface. In these embodiments, the laser beam spot for the Raman spectroscopic analysis and the X-ray beam spot for the XPS analysis can be each less than about 20 microns, such as less than about 15 microns, in diameter at the sample surface.

In yet another embodiment, a process of analyzing a sample by Raman spectroscopy includes providing a sample to be analyzed, the sample having a sample surface that includes a protective layer to protect the surface from at least one component of air, positioning the sample having the protective layer in a vacuum chamber, bombarding the sample surface in the vacuum chamber with ions to remove the protective layer from at least one selected area of the sample surface, and performing a Raman spectroscopic analysis on the at least one selected area of the sample surface from which the protective layer has been removed. The process can further include performing an XPS analysis on the at least selected area of the sample surface after one or more stages of bombarding the at least one selected area of the sample surface with ions to determine if the protective layer has been removed. In these embodiments, the process can further include stopping bombarding the at least one selected area of the sample surface with ions when the XPS analysis indicates that the protective layer has been removed. The at least one component of air can be oxygen or water. In some embodiments, the ions can be cluster ions. The protective layer can include metals, metal oxides, polymers, semiconductors, metal nitrides, silicon compounds, diamond, and diamond-like carbon. More generally, the XPS analysis can be used to determine when changes to the surface composition have occurred, for example following ion bombardment, and Raman analysis can be performed once the surface composition has changed to a desired state as determined by the XPS analysis.

In still another embodiment, a process of analyzing a sample surface by Raman spectroscopy and X-ray photoelectron spectroscopy (XPS) includes providing a sample having a sample surface within a vacuum chamber, performing a Raman spectroscopic analysis on at least one selected area of the sample surface within the vacuum chamber to provide Raman spectroscopic results, performing an XPS analysis of the at least one selected area of the sample surface within the vacuum chamber to provide XPS analysis results, and performing multivariate statistical analysis of the Raman spectroscopic results and XPS analysis results to identify chemical and/or structural features of the sample surface. The multivariate statistical analysis can include principal components analysis (PCA). In some embodiments, the process can further include combining the Raman spectroscopic results and XPS analysis results and performing the multivariate statistical analysis on the combined results. In certain embodiments, the process can further include performing multivariate statistical analysis of the Raman spectroscopic results to identify one or more Raman phases comprising chemical and/or structural phases, and performing multivariate statistical analysis of the XPS analysis results to identify one or more XPS phases comprising chemical and/or structural phases. In these embodiments, the process can further include correlating or performing multivariate statistical analysis of the identified one or more Raman phases and one or more XPS phases. In some embodiments, the Raman spectroscopic analysis and XPS analysis can be performed simultaneously. In certain embodiments, the Raman spectroscopic analysis and XPS analysis can be performed with similar, or substantially the same, spatial resolution. In these embodiments, a laser beam spot for the Raman spectroscopic analysis and an X-ray beam spot for the XPS analysis can be substantially co-aligned at the sample surface. The laser beam spot for the Raman spectroscopic analysis and the X-ray beam spot for the XPS analysis can be each less than about 20 microns, such as less than about 15 microns, in diameter at the sample surface. In some embodiments, the process can further include repeating each of the Raman spectroscopic analysis and XPS analysis at a plurality of selected areas of the sample surface to obtain an image of chemical and/or structural features of the sample surface identified by the multivariate statistical analysis. In certain embodiments, the process can further include translating the sample stage to perform each of the Raman spectroscopic analysis and XPS analysis at a plurality of selected areas of the sample surface.

In another embodiment, a process for characterizing a carbon-containing sample includes placing a carbon-containing sample having a sample surface within a vacuum chamber, performing a Raman spectroscopic analysis on a selected area of the sample surface within the vacuum chamber, and performing an X-ray photoelectron spectroscopy (XPS) analysis on the same selected area of the sample surface within the vacuum chamber. The carbon-containing sample can be a sample comprising carbon nanotubes, and the Raman spectroscopic analysis can include obtaining a ratio between a Raman G band and a Raman D band, such as a Raman 1D band or a Raman 2D band, to identify single walled carbon nanotubes. The Raman spectroscopic analysis can further include measuring frequencies of radial breathing modes of the single wall carbon nanotubes to obtain diameters of the single wall carbon nanotubes. In some embodiments, the process can further include determining from the Raman spectroscopic analysis and/or XPS analysis whether there are defects in the carbon nanotubes. The XPS analysis can include a measurement of at least one of $sp^2$ and $sp^3$ carbon composition of the sample.

In certain embodiments, the process can further include bombarding the selected area of the sample surface with ions to sputter material from the sample surface, and repeating the Raman spectroscopic analysis and the XPS analysis on the selected area of the sample surface after sputtering the material from the sample surface, optionally performing one or more further cycles of the bombarding and analysis steps to provide Raman spectroscopic analysis and XPS analysis at a plurality of depths in the sample surface. In these embodiments, the process can further include subtracting results from the Raman spectroscopic analysis before bombarding the selected area of the sample surface with ions from results after bombarding the selected area of the sample surface with ions, or, alternatively, subtracting results from the Raman spectroscopic analysis after bombarding the selected area of the sample surface with ions from results before bombarding the selected area of the sample surface with ions. The ions can be ion clusters. In some embodiments, a laser beam spot for the Raman spectroscopic analysis and an X-ray beam spot for the XPS analysis can be substantially co-aligned at the sample surface. In these embodiments, the laser beam spot for the Raman spectroscopic analysis and the X-ray beam spot for the XPS analysis can be each less than about 20 microns, such as less than about 15 microns, in diameter at the sample surface. In certain embodiments, a laser beam for the Raman spectroscopic analysis and an X-ray beam for the XPS analysis can be focused to substantially the same size at the sample surface. In some embodiments, the process can further include the step of, prior to performing the Raman spectroscopic analysis and the XPS analysis, bombarding the selected area of the sample surface with ions to sputter material from the sample surface. In certain embodiments, the process can further include performing multivariate statistical analysis of results of the Raman spectroscopic analysis and the XPS analysis. In some embodiments, the process can further include combining results of the Raman spectroscopic analysis and the XPS analysis and performing multivariate statistical analysis on the combined results.

In yet another embodiment, an X-ray photoelectron spectroscopy (XPS) and Raman spectroscopy alignment system includes a vacuum chamber, a sample stage mounted within the vacuum chamber, a Raman laser transfer optical assembly mounted within the vacuum chamber and configured to focus a Raman laser beam on a selected area on the sample stage, a video camera mounted outside the vacuum chamber and configured to provide images of the sample stage, an X-ray source mounted within the vacuum chamber and configured to direct X-rays toward the same selected area of the sample stage, and an X-ray alignment indicator mounted on the sample stage that provides a visual indication of X-ray location viewable by the video camera on the sample stage in response to X-rays directed toward the sample stage. The camera can be configured to provide images of the sample stage through a window on the vacuum chamber. In some embodiments, the X-ray source can be a microfocus X-ray source. In these embodiments, the X-ray location on the sample stage can be less than or equal to about 15 microns in diameter, the Raman laser location on the sample stage can be less than or equal to about 15 microns in diameter, and an alignment tolerance between the Raman laser location and X-ray location can be less than about 10 microns, such as about 5 microns. In some embodiments, the Raman laser transfer optical assembly can include standard antireflection coated optics. In some embodiments, the Raman laser source and the returned Raman scattered light are coupled into and out of the vacuum space through an optical window that is leak tight to UHV standards. In some embodiments, the optical window is located at the end of the Raman laser transfer optical assembly nearest the sample. The large working distance from the sample to the Raman spectrometer can be overcome by the incorporation of a low magnification objective lens in the Raman laser transfer optic to achieve good coupling efficiency. In certain embodiments, the X-ray alignment indicator can include a phosphorescent material that is sensitive to the X-rays.

In some embodiments, the alignment system can further include a Raman spectrometer having a Raman laser for providing the Raman laser beam, wherein the Raman spectrometer is located proximally to the vacuum chamber. In one embodiment the Raman spectrometer is fixed on a base plate mounted on the vacuum chamber, wherein the base plate is adjustable to allow the location of the Raman laser beam to be aligned with the X-ray location on the sample stage. In another embodiment the Raman spectrometer is located on a planar surface next to the vacuum chamber, wherein the location of the Raman laser beam is aligned with the X-ray location on the sample stage using at least 2 kinematic mirrors located outside of the Raman spectrometer. The Raman spectrometer can include a spectrograph for receiving Raman scattered light from the sample stage along a scattered light path and directing the received Raman scattered light to a Raman detector, wherein the Raman spectrometer comprises adjustment optics for adjusting the laser beam in order to maximize the intensity of the scattered light at the detector. The Raman spectrometer can be a Raman spectrometer as described in U.S. Pat. No. 6,661,509 issued to Deck et al., the disclosure of which is hereby incorporated by reference in its entirety (however, where anything in the incorporated reference contradicts anything stated in the present application, the present application prevails).

In still another embodiment, a method of aligning an X-ray photoelectron spectroscopy (XPS) system and a Raman spectroscopy system includes viewing an X-ray alignment indicator mounted on a sample stage within a vacuum chamber, directing X-rays toward a selected area on the X-ray alignment indicator that provides a visual indication of X-ray location on the sample stage in response to the X-rays, and focusing a Raman laser beam on the same selected area on the sample stage. The Raman laser can be a visible laser, which assists in alignment of the laser beam and X-ray beam. Focusing the Raman laser beam can include focusing on a Raman focus indicator mounted on the sample stage that provides a Raman signal and/or spectrum in response to the Raman laser beam. In some embodiments, the Raman focus indicator can include silicon. In certain embodiments, the Raman focus indicator can include lithium niobate. The X-ray alignment indicator can include a phosphorescent material that is sensitive to the X-rays.

This invention has many advantages, such as enabling simultaneous acquisition of Raman and XPS spectra and mapping of spectral features on a sample.

BRIEF DESCRIPTION OF THE DRAWINGS

FIGS. 6A, 6B, 6C and 6D are exemplary XPS data showing the determination of carbon $sp^2$ and $sp^3$ content.

Like reference numerals refer to corresponding parts throughout the several views of the drawings.

DETAILED DESCRIPTION OF EMBODIMENTS

Figure 1A:
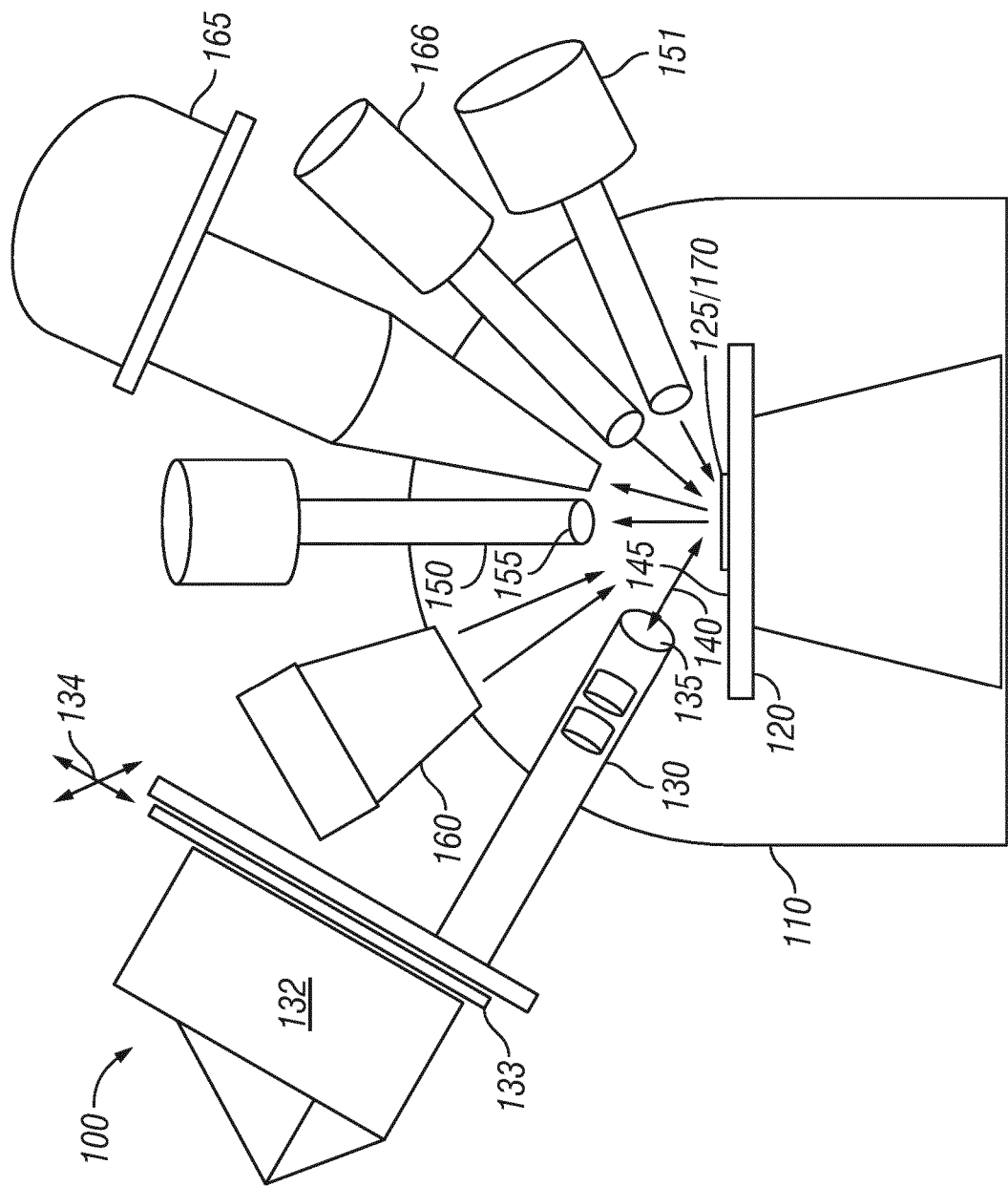
FIGS. 1A and 1B are illustrations of an exemplary embodiment of an X-ray photoelectron spectroscopy (XPS) system and a Raman spectroscopy system.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

The combination of Raman and XPS is particularly useful. XPS is the preferred technique to provide both elemental and chemical information with a depth resolution of typically less than 3 nm and, in conjunction with depth profiling, to perform analysis to a depth of a few microns from the surface. Confocal Raman spectroscopy is an analytical technique that provides molecular structure information with a nominal depth resolution on the order of a few microns. Despite the advantages of this combination, no instrument is currently available to provide Raman and XPS data simultaneously from the same sample. U.S. Pat. No. 6,333,784 issued to Blasi et al., on Dec. 25, 2001 (hereinafter "Blasi"), the disclosure of which is hereby incorporated by reference in its entirety (however, where anything in the incorporated reference contradicts anything stated in the present application, the present application prevails) recognizes these benefits in using the combination of Raman and XPS for the analysis of corrosion products. Blasi, however, used an unfocussed, large area, X-ray source, and therefore did not have the advantages of the approach described below.

The Raman/XPS combined capability is particularly beneficial on systems which have the capability to analyze small features on the surface of the sample, by using focused excitation beams of similar sizes. For example, the Thermo Scientific DXR RAMAN microscope uses a focused laser beam which at low magnification may be tens of microns, such as 20 microns, in diameter. Thermo Scientific XPS systems use a microfocus X-ray source that produces focused X-ray beams and, in the case of the Thermo Scientific THETA PROBE, an X-ray beam less than or equal to 15 microns can be selected. By accurately aligning the two excitation sources, data can be simultaneously recorded from the same feature on the sample. By translating the stage on which the sample is mounted, multi-pixel chemical maps can be produced simultaneously from both techniques with perfect image registration. This registration cannot be guaranteed when analysis is performed on separate instruments, and also facilitates further post processing of the data. As described further below, as an alternative to simultaneous acquisition of data from both techniques, a Raman spectroscopic map of the surface may be obtained first by translating the stage on which the sample is mounted, thereby providing a multi-pixel Raman map, followed by obtaining an XPS map by translating the stage on which the sample is mounted, thereby providing a multi-pixel XPS map. The sample stage position during its translation is recorded (for each pixel analyzed by Raman and/or XPS) so that the Raman and XPS maps can be aligned. By sequential, rather than simultaneous, acquisition of Raman and XPS measurements, certain embodiments are possible, for example performing fast Raman mapping followed by slower XPS mapping, optionally wherein the XPS mapping is performed for fewer pixels than the Raman mapping in order to save analysis time.

Figure 1B:
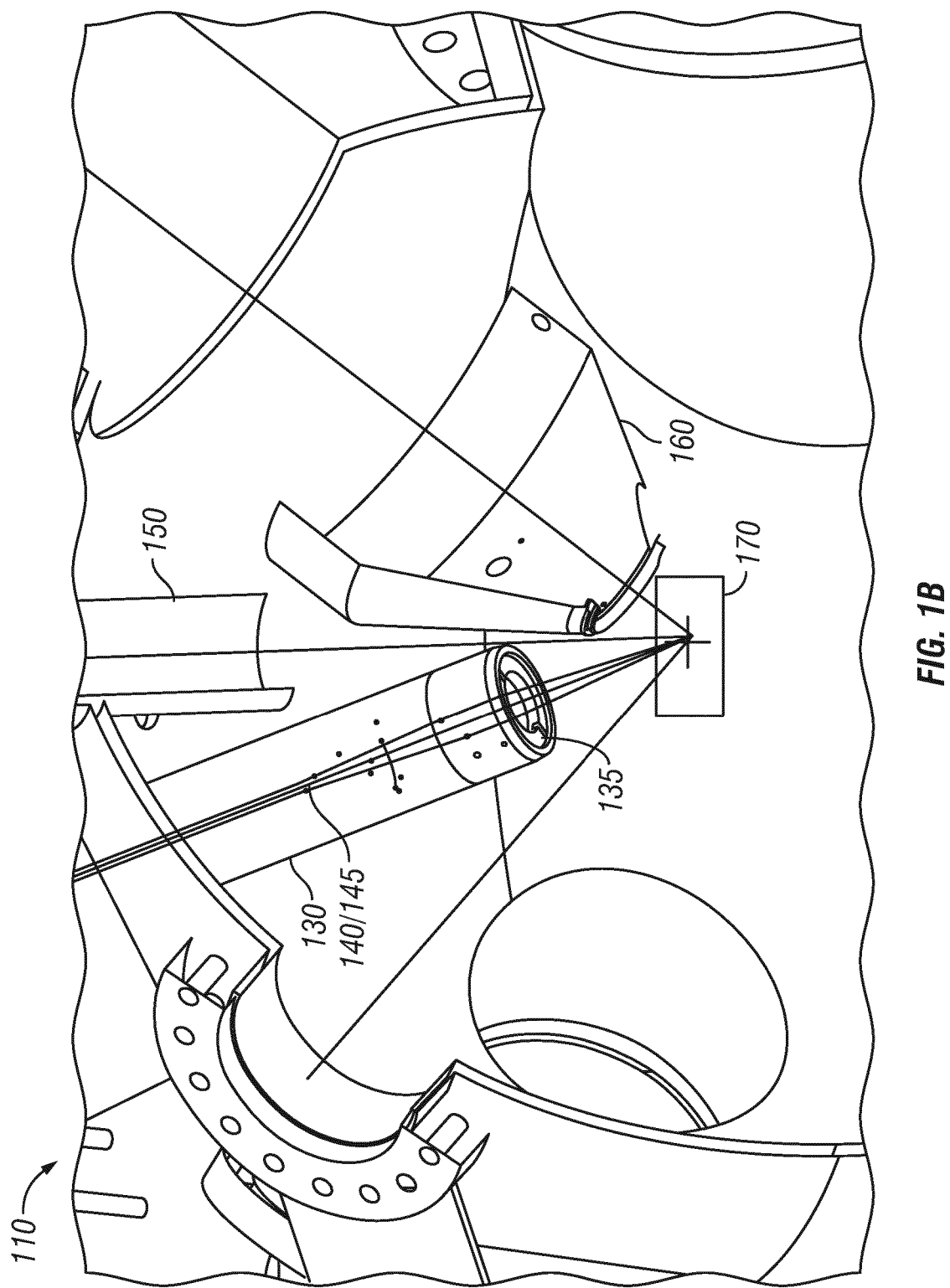

In one embodiment shown in FIGS. 1A and 1B, wherein FIG. 1A is highly schematic, an X-ray photoelectron spectroscopy (XPS) and Raman spectroscopy alignment system 100 includes a vacuum chamber 110, a sample stage 120 mounted within the vacuum chamber 110, a Raman laser transfer optical assembly 130 mounted within the vacuum chamber 110 and configured to focus a Raman laser beam 140 on a selected area 125 on the sample stage 120, a Raman spectrometer 132, a video camera 150 mounted outside the vacuum chamber 110 and configured to provide images of the sample stage 120, an X-ray source 160 mounted within the vacuum chamber 110 and configured to direct a beam of X-rays toward the same selected area 125 of the sample stage 120, an XPS electron energy analyzer and detector 165, and an X-ray alignment indicator 170 mounted on the sample stage 120 that provides a visual indication of X-ray location viewable by the video camera 150 on the sample stage 120 in response to X-rays directed toward the sample stage 120. An ion source 166 is configured to direct monatomic ions or cluster ions toward the sample stage 120. As shown in FIGS. 1A and 1B, the excitation laser beam 140 and the returned Raman scatter 145 are coupled into the vacuum space through an optical window 135 which is leak tight to UHV standards. In the example illustrated in FIG. 1A, Raman spectrometer 132 is mounted on a base plate 133 that is adjustable independently in the X and Y directions of an X-Y plane 134 shown in FIG. 1A that lies parallel to the base plate 133. It will also be appreciated that other configurations and positional relationships of Raman spectrometer 132 and vacuum chamber 110 and that some elements illustrated in FIG. 1A may not be required in some configurations and thus the example of FIG. 1A should not be considered as limiting. An example of an alternative configuration comprises Raman spectrometer 132 as an integrated or independent device positioned proximally to vacuum chamber 110 (e.g. such as to one side of the vacuum chamber on a bench top or other planar surface) and optically connected by an embodiment of Raman laser transfer optical assembly 130. In such a configuration base plate 133 may not be required with the functionality of independent adjustability for alignment (e.g. X-Y plane 134) provided by other means such as by the use of at least two kinematic mirrors as described below in reference to FIG. 4C.

Figure 2:
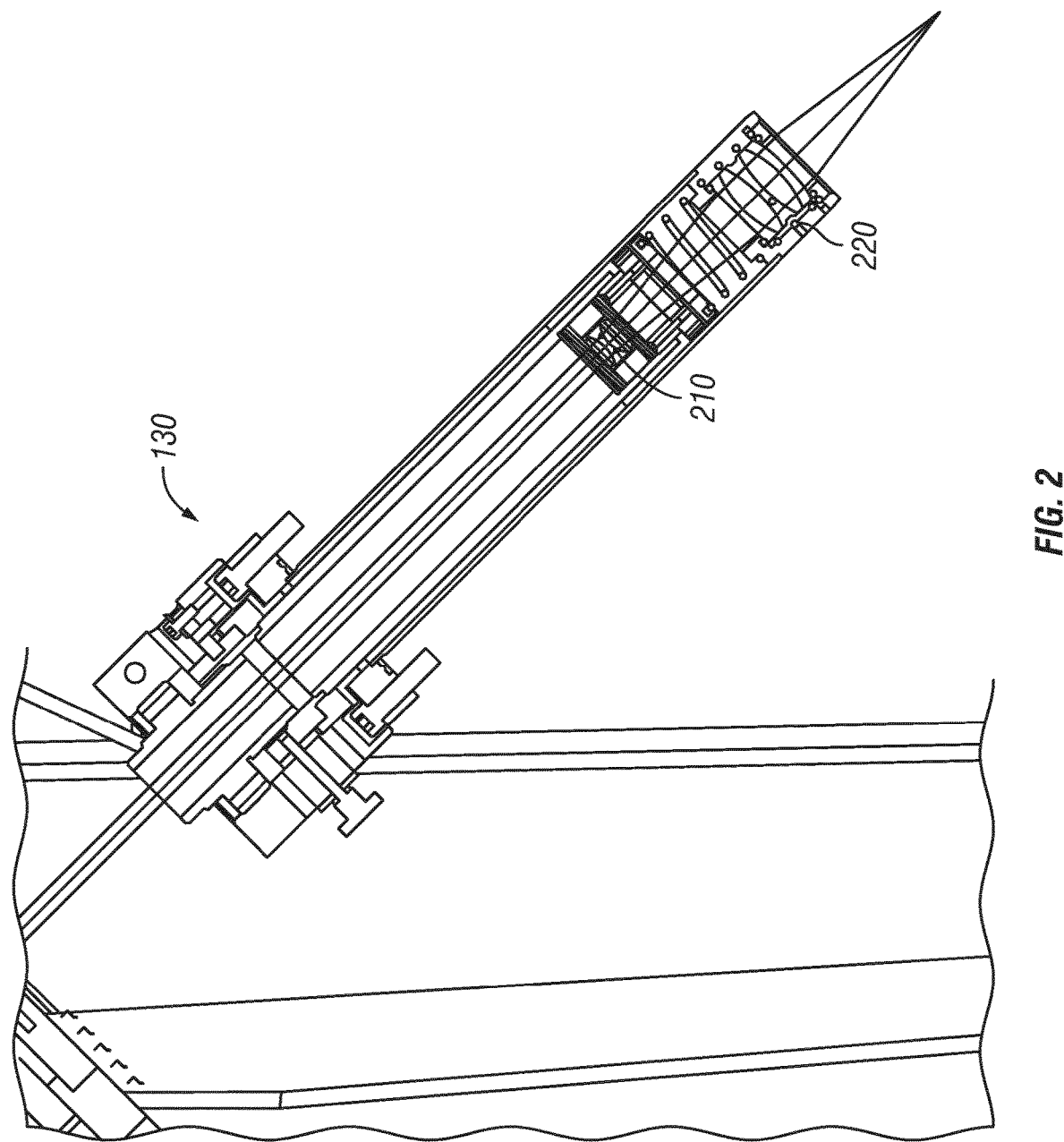
FIG. 2 is an illustration of an exemplary embodiment of a Raman laser transfer optical assembly.

The large working distance from the sample stage selected area 125 to the Raman laser transfer optical assembly 130 and Raman spectrometer 132 necessitates the incorporation of a low magnification objective lens 210, as shown in FIG. 2. This lens 210 is combined with a transfer optic 220 to achieve good optical coupling efficiency, with the large working distance, in a range of between 55 mm and 75 mm, such as 70 mm, enabling the use of standard antireflection coated optics for the Raman laser transfer optical assembly 130, instead of optics coated with a conductive coating, such as indium tin oxide (ITO). Such conductive coatings are used to prevent charging of surfaces during XPS analysis, but they also typically reduce optical coupling efficiency by 20-25%.

Turning back to FIGS. 1A and 1B, the camera 150 can be configured to provide images of the sample stage 120 through a window 155 on the vacuum chamber 110. A sample viewing light source 151 illuminates the sample stage 120 for the camera 150. The X-ray source 160 is a microfocus X-ray source as described above. The X-ray location on the sample stage 120 can be less than or equal to about 20 μm, such as 15 μm in diameter, the Raman laser location on the sample stage 120 can be less than or equal to about 20 μm, such as 15 μm in diameter, and an alignment tolerance between the Raman laser location and X-ray location can be less than about 10 μm, such as about 5 μm. In one embodiment, the X-ray alignment indicator 170 is a phosphorescent material that is sensitive to the X-rays, such as a Zn Cd based P20 phosphor or a Gd O based P43 phosphor. A visual indication of the X-ray location the sample stage can thus be viewed with the camera 150.

Figure 3:
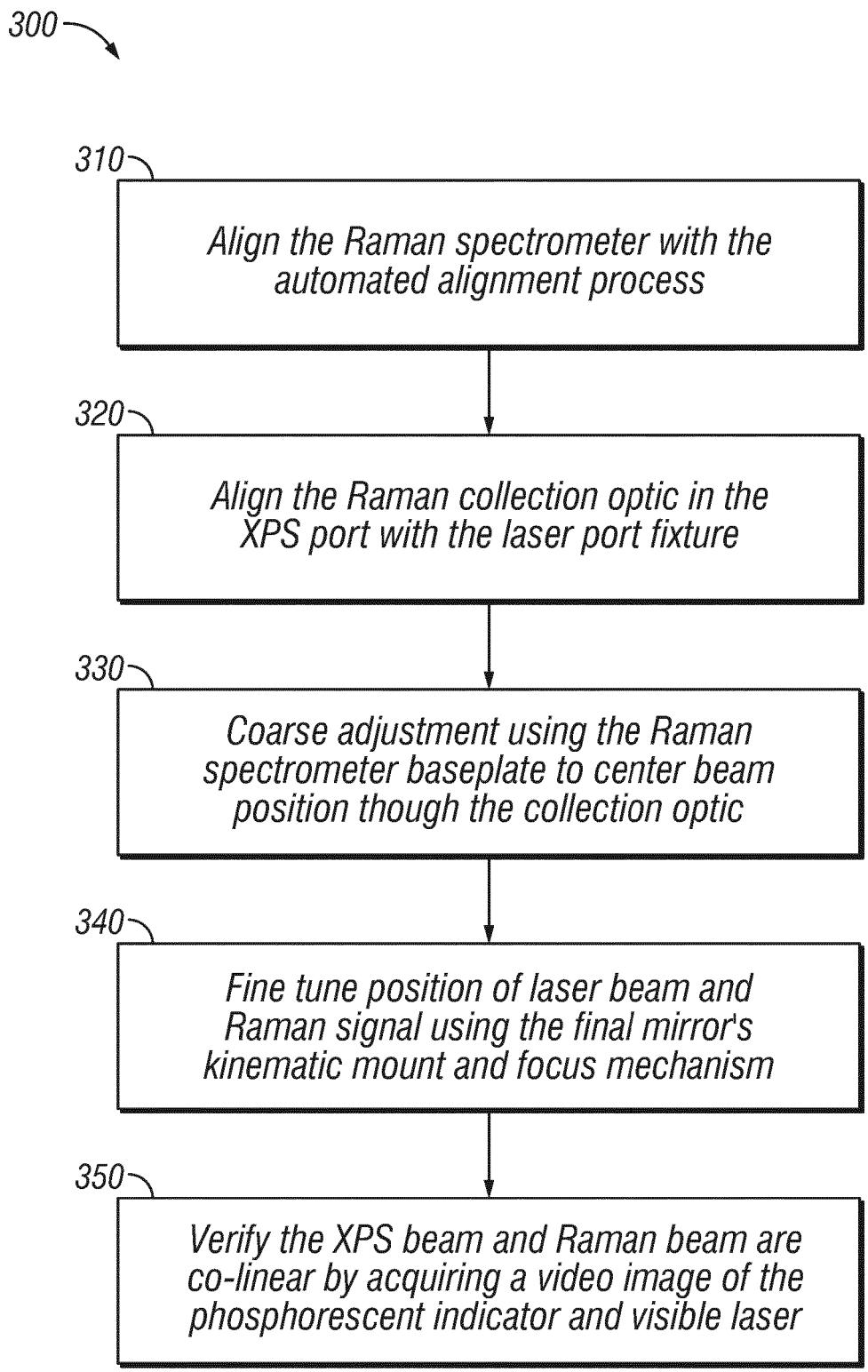
FIG. 3 is a flowchart of an exemplary method of aligning an XPS system and a Raman spectroscopy system.

For feature alignment and mapping, the focused laser beam 140 and the focused X-ray beam need to be substantially coincident. This has required the Raman spectrometer 132 to be integrated into the structure of the XPS system for precise, stable and reproducible alignment and focusing, as described below and shown in FIG. 3.

Precise alignment of the Raman spectrometer 132 before coupling to the XPS is outlined in U.S. Pat. No. 6,661,509 issued to Deck et al., on Dec. 9, 2003, the disclosure of which is hereby incorporated by reference in its entirety (however, where anything in the incorporated reference contradicts anything stated in the present application, the present application prevails), also referred to herein as the automated alignment process, step 310 shown in FIG. 3. In brief, a broadband light source is turned on to project light through a small aperture which is passed on a return light beam path to the input aperture of a spectrograph where it reaches the systems detector. This alignment is for the return beam path and optimizes the beam path to a maximum amount of light, thereby aligning the return beam path to the intended sample focal point. After completion, the broadband light source is turned off and a laser is turned on to provide an illumination of the beam path that extends through the microscope objective and onto the sample. This path is ultimately detected by the systems detector. The illumination path is then adjusted until the detected light is then optimized to give the highest Raman signal at the intended focal point on the sample. This alignment process is done before the Raman spectrometer is placed on the XPS system.

Figure 4A:
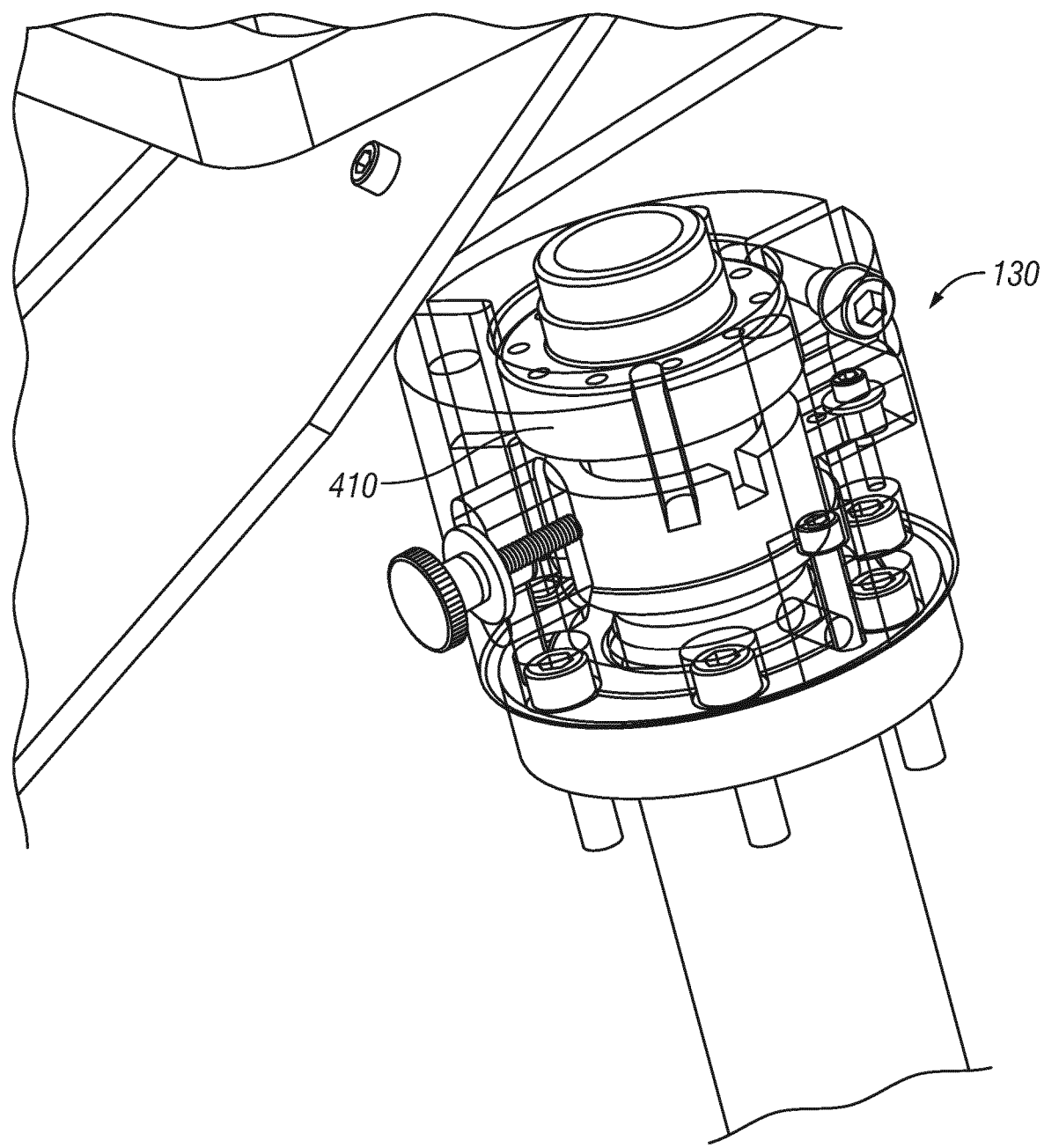
FIGS. 4A, 4B, and 4C are additional illustrations of exemplary embodiments of a Raman spectrometer and laser transfer optical assembly.
Figure 4B:
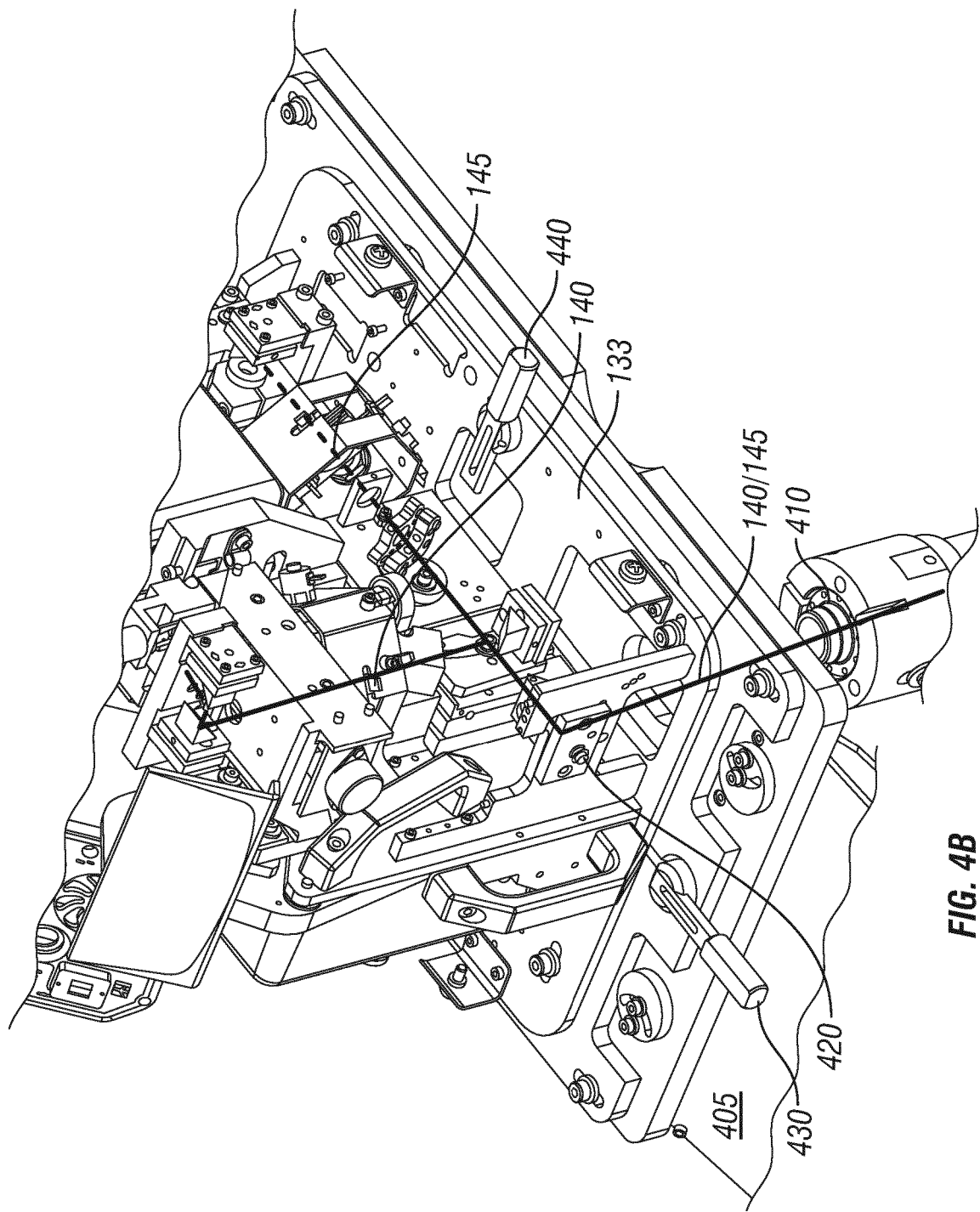

Turning back to FIG. 1A, an embodiment of the alignment system includes a Raman spectrometer 132 having a Raman laser for providing the Raman laser beam 140, wherein the Raman spectrometer 132 is fixed on a base plate 133. As shown in FIG. 4B, a bracket 405 attached to the vacuum chamber 110 (not shown) supports the base plate 133 that is adjustable independently in the X and Y directions of an X-Y plane 134 that lies parallel to the base plate 133 by means of the kinematic mirror 420 and adjustment knobs 430 and 440, to enable the location of the Raman laser beam 140 to be aligned with the X-ray location on the sample stage 120. By convention, the Y-axis of X-Y plane 134 is also parallel to the sample stage 120, and therefore adjustments of the Raman laser beam 140 in the X-axis typically involve refocusing the Raman laser beam 140 on the same spot on the sample stage 120, due to the 45° angle of incidence of the Raman laser beam 140 onto the sample stage 120 (see FIG. 1A). The Raman spectrometer 132 includes a spectrograph for receiving Raman scattered light from the sample stage along a scattered light path 145 and directing the received Raman scattered light 145 to a Raman detector, wherein the Raman spectrometer comprises adjustment optics for adjusting the laser beam path in order to maximize the intensity of the scattered light at the detector after focusing on a Raman signal indicator on the sample stage. The Raman signal indicator can be, for example, a silicon wafer, lithium niobate, or another flat sample material having a strong Raman signal.

Turning back to FIG. 3, a laser port fixture with a known pointing accuracy is used to confirm at step 320 the alignment of the Raman laser transfer optical assembly 130 mounted in the XPS port. A flexible copper gasket is tightened to center the laser beam through the collection optics. The Raman spectrometer is then mounted on the XPS system. The method 300 of aligning an X-ray photoelectron spectroscopy (XPS) system and the Raman spectroscopy system then includes viewing an X-ray alignment indicator mounted on the sample stage within the vacuum chamber, directing X-rays toward a selected area on the X-ray alignment indicator that provides a visual indication of X-ray location on the sample stage in response to the X-rays, viewable by the video camera, and focusing the Raman laser beam on the same selected area on the sample stage.

In one embodiment the coarse adjustment on the Raman spectrometer base plate at step 330 enables the laser beam to be aligned in the vicinity of the XPS beam position. The video image is acquired from a view of 45 degrees above the laser excitation source and is used to align the laser beam to the exact position of the XPS beam at step 340. In an alternative embodiment, such as one that does not include base plate 133, the coarse adjustment is achieved by centering Raman laser beam 140 down the center of Raman laser transfer optical assembly 130 at step 330 and fine tuning the position of Raman laser beam 140 and scattered light path 145 using at least 2 kinematic mirrors positioned in close proximity to a focusing mechanism. In the described example, the embodiments of kinematic mirror may be positioned in a location that is external to Raman spectrometer 132.

Figure 4C:
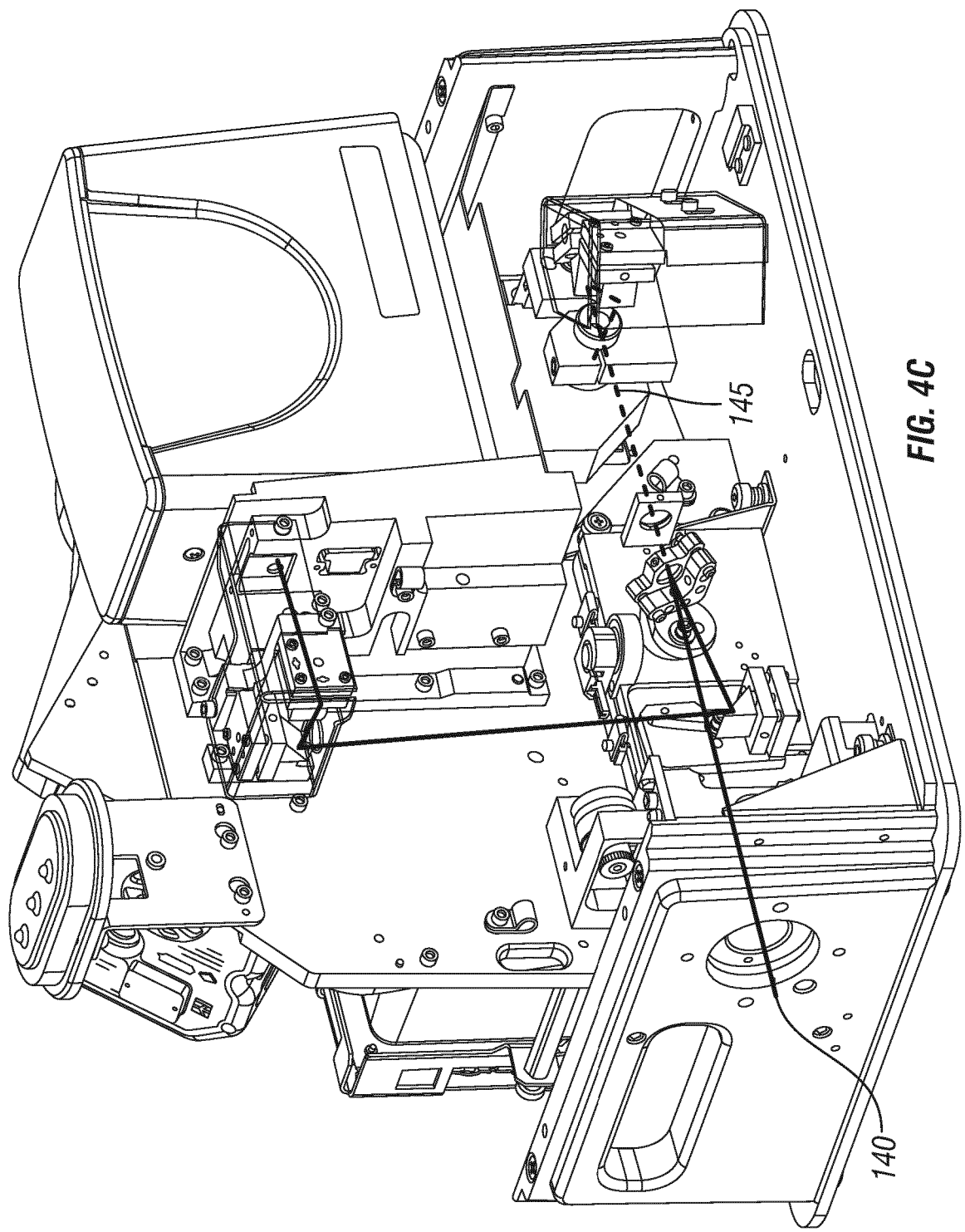

In either of the embodiments described above, the exact position of the XPS beam is marked by the video camera cross hairs which indicate the lateral spatial coordinates of the X-ray beam. This was determined at step 350 from the X-ray intensity from the X-ray alignment indicator, the phosphorescent material that is sensitive to X-rays. Focusing the Raman laser beam includes focusing on a Raman focus indicator mounted on the sample stage that provides a Raman spectrum in response to the Raman laser beam, such as silicon or lithium niobate. As shown in FIGS. 4A and 4B, a fine-thread (i.e., ≥80 threads/inch, such as 140 threads/inch) or differential screw based mechanism 410 that is adjustable from outside the vacuum chamber, and kinematic mirror 420 are used to focus and maximize the Raman signal while placing the laser beam in a co-aligned position to the X-ray beam on the sample stage. FIG. 4C also provides an illustrative example of an embodiment of a Raman laser transfer optical assembly that utilizes at least 2 kinematic mirrors located outside of Raman spectrometer 132 to align laser beam 140 to the XPS beam in course adjustment step 330. For example, FIG. 4C comprises 3 kinematic mirrors due to the compound angle relationship of the port on the XPS to Raman spectrometer 132.

XPS and Raman spectroscopy are powerful tools for the characterization of carbon-based materials, for example carbon-based nanomaterials. For the analysis of carbon-containing materials with unique mechanical and electrical properties (e.g., carbon nanotubes, graphene, silicon carbide) the acquisition of a Raman spectrum is significantly faster than that of an XPS spectrum. The acquisition of a Raman spectrum can be 10-100 times faster than the acquisition of a XPS spectrum. The experiment time is compounded when mapping a sample, where a map is a collection of Raman or XPS spectra. The fast acquisition of a Raman map enables the identification of such features to be performed prior to XPS analysis.

In one embodiment, a process of analyzing a sample by Raman spectroscopy and X-ray photoelectron spectroscopy (XPS) includes providing a sample having a sample surface within a vacuum chamber, performing a Raman spectroscopic analysis on a plurality of selected areas of the sample surface within the vacuum chamber to map an area of the sample surface comprising the selected areas, the Raman spectroscopic analysis including identifying one or more chemical and/or structural features of the sample surface in one or more of the selected areas of the sample surface, and performing an X-ray photoelectron spectroscopy (XPS) analysis of one or more selected areas of the sample surface containing at least one chemical and/or structural feature identified by the Raman spectroscopic analysis, wherein the duration of the XPS analysis of a given selected area of the sample surface is longer than the duration of the Raman spectroscopic analysis of that given selected area of the sample surface. In certain embodiments, the duration of the XPS analysis is longer than the duration of mapping of the sample surface by the Raman spectroscopic analysis. The duration of the XPS analysis can be at least 2 times, or 5 times, or 10 times, or 100 times longer than the duration of mapping of the sample surface by the Raman spectroscopic analysis. In some embodiments, a laser beam spot for the Raman spectroscopic analysis and an X-ray beam spot for the XPS analysis can be substantially co-aligned at the sample surface. In these embodiments, the laser beam spot for the Raman spectroscopic analysis and the X-ray beam spot for the XPS analysis each can be less than about 20 microns in diameter at the sample surface, such as less than about 15 microns in diameter at the sample surface. In certain embodiments, a laser beam for the Raman spectroscopic analysis and an X-ray beam for the XPS analysis can be focused to substantially the same size at the sample surface. The small (15-20 microns) size of the focused X-ray beam necessitates long acquisition times for XPS analysis, as the power output of the X-ray source is scaled to maintain a constant X-ray flux per unit area on the sample, and to prevent damage to the anode in the X-ray source. Therefore, obtaining comparable signal to noise as the X-ray spot size is reduced necessitates longer acquisition times, of as much as several minutes per spectrum. Thus, a relatively fast Raman analysis map or image of the surface can be obtained followed by a relatively slow XPS analysis map or image of the surface. The Raman and XPS analysis of the selected areas of the surface can provide both a Raman and an XPS image of the sample surface. The selected areas of the surface analysed correspond to pixels of the image. In some embodiments, the XPS analysis is performed for each of the selected areas as the Raman analysis. However, to reduce overall analysis times, the XPS analysis can be performed at less than all the selected areas analysed by the Raman analysis. For example, in certain embodiments, the Raman analysis may identify a region comprising a spatially connected plurality of selected areas (i.e. pixels) of the surface contains one or more chemical and/or structural features in common and the XPS analysis may subsequently be performed for a subset of that spatially connected plurality of selected areas of the region (e.g., just one or two selected areas of that region). In such embodiments, the Raman mapping provides an initial chemical and/or structural map of the surface and the XPS analysis is performed only on a limited part of the surface mapped by the Raman analysis, for example XPS analysis is performed only in selected areas within regions showing features of interest. The XPS information derived from the selected areas within the region can be applied to the whole region as an approximation. This is especially so if the XPS analysis identifies the same features from the selected areas within the region where more than one selected area is subject to XPS within the region. This reduces the amount of time spent performing the more time consuming XPS analysis. If the Raman spectroscopic mapping does not reveal any features of interest requiring to be studied by XPS analysis, then the XPS analysis need not be performed at all.

In some embodiments, the XPS analysis can include a quantitative analysis of one or more species present on the sample surface. In certain embodiments, the XPS analysis can include measuring at least one of an $sp^2$ and $sp^3$ carbon composition of the sample. This can be useful for example for samples comprising graphene, graphite, and/or carbon nanotubes. In some embodiments, the sample can include a material selected from the group consisting of: inorganic material, organic material, metal oxide material, polymer material, semiconductor material, silicon carbide, graphite, diamond, graphene, carbon nanotubes, and single walled carbon nanotubes. In certain embodiments, the Raman spectroscopic analysis can include identifying and characterizing carbon nanotubes in the sample by determining characteristics of at least one of a Raman G band, a Raman D band and a carbon nanotube radial breathing mode (RBM). In these embodiments, the analysis can include comparing relative spectral positions and/or intensities of at least two of: a Raman G band, Raman D band and RBM band present from the Raman spectroscopic analysis. The analysis can further include obtaining a ratio between a Raman G band and a Raman D band, such as a Raman 1D band and a Raman 2D band, to identify single walled carbon nanotubes. In some embodiments, the analysis can further include measuring at least one frequency of a radial breathing mode to obtain at least one diameter of a carbon nanotube. The information from Raman analysis can be combined with information from XPS analysis, for example measuring at least one of an $sp^2$ and $sp^3$ carbon composition of the sample by XPS, in order to further characterize the sample.

Raman spectroscopy interrogates the vibrations in covalently bonded molecules. Covalently bonded molecules naturally vibrate and the movement of the atoms as they vibrate can be described in terms of normal modes of vibration. Each vibrational normal mode will have a specific frequency which is directly related to its energy. These normal modes are what give rise to peaks in a material's Raman spectrum. The specific frequencies/energies where the peaks are observed will be very sensitive to the bonding and structure in the molecules as well as the environment (stress, strain, heat, etc.) that the molecules are in.

The spectral content (band position, band intensity and band shape) in a Raman spectrum provides important information about a material under investigation. For instance, the Raman spectrum of single walled carbon nanotubes (SWCNT) will be composed of a number of bands that appear at different energies. For carbon nanotubes (CNT), there are a number of primary Raman bands that provide vital information about the nature of the CNTs. At the low end of the spectrum, there are the radial breathing modes (RBM), centered around 1350 $cm^{-1}$ there is the D band, often referred to as the diamond, defect, or disorder band, and another band centered at 1580 $cm^{-1}$, known as the graphitic band or G-band. See Dresselhaus et al., Perspectives on Carbon Nanotubes and Graphene Raman Spectroscopy, Nano Lett. 10(3), pp. 751-758 (2010), the disclosure of which is hereby incorporated by reference in its entirety (however, where anything in the incorporated reference contradicts anything stated in the present application, the present application prevails).

Radial breathing modes (RBMs) can be described as the symmetric stretch of the tube along the short axis of the tube. The peak position of the RBM modes can be correlated with diameter of the SWCNT and has been found to be empirically derived by:

$$D(nm)=248/\omega \qquad \text{Eq. (1)}$$

where D is the diameter in nanometers and co is the Raman shift ($cm^{-1}$).

Figure 5:
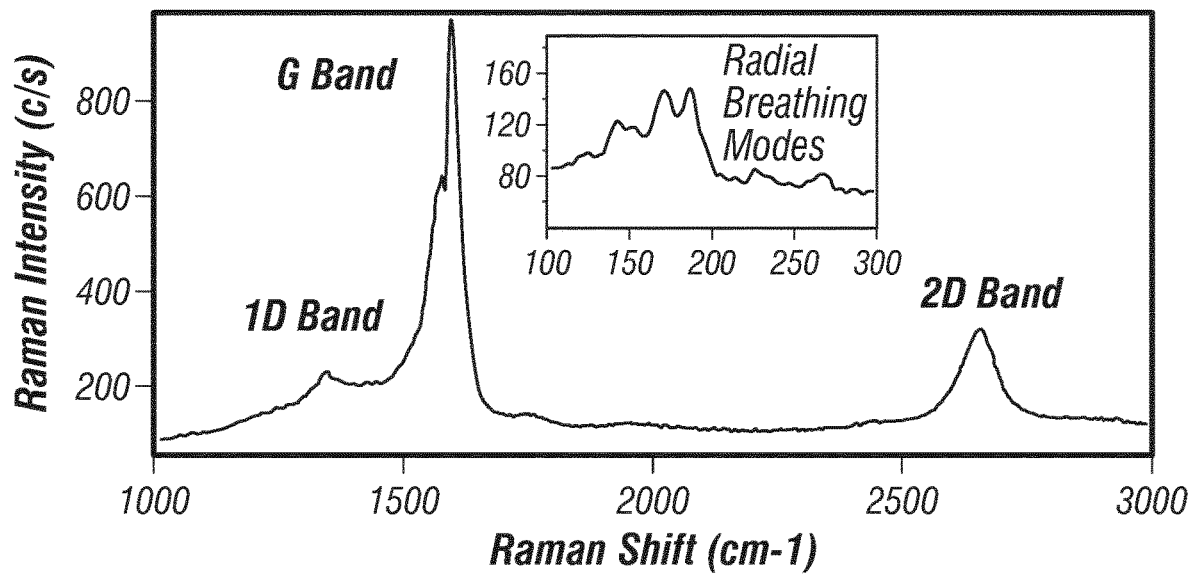
FIG. 5 is an exemplary Raman spectrum showing Raman 1D, 2D, G bands and radial breathing modes.

Equation 1 shows that there is an inverse relationship between the diameter of the carbon nanotube and the frequency of RBM vibration. The RBM modes occur at Raman shift energies in the range of <50-700 $cm^{-1}$. The RBM modes shown in the inset of FIG. 5 show that there are several bands present in the region from about 100 $cm^{-1}$ out to about 300 $cm^{-1}$ with each band corresponding to a particular diameter of CNT in the sample material under study. This range of frequencies indicates that there is a range of diameters in this sample of CNTs with diameters corresponding to 2.5-0.8 nm. Thus, the RBM modes in a Raman spectrum provide information about the diameter of the CNTs in a sample and also enable determining whether the sample is a mixture of a range of diameters.

The D band is observed in a carbon nanotube's spectrum when the carbon nanotube has a defect(s) in its extended carbon framework. The defects effectively disrupt the extended $sp^2$ hybridized network of bonds in the tube replacing the $sp^2$ hybridized bonds with $sp^3$ bonds. The observation of the D band can occur when the CNT is damaged (the breaking of bonds) or it can be caused by some intentional chemical functionalization of the CNT. There's a third scenario that gives rise to an enhanced D band and that it due to presence of a carbon impurity. During the process of synthesizing SWCNT, there are a few undesirable impurities that must be eliminated prior to study or use through purification. Two impurities of greatest concern are amorphous carbon and multi-walled carbon nanotubes (MW-CNT). Both of these impurities result in the presence of an enhanced D band. Generally, when studying SWCNT or fabricating a device using SWCNT, the SWCNT is first highly purified to contain only SWCNT. Thus, the Raman spectrum, specifically, the presence and intensity of the D band can give an indication of the overall purity of the sample of SWCNT under investigation.

The G band contains vital information about SWCNTs. Specifically, the G band arises from the extend network of $sp^2$ hybridized bonds making up the SWCNT. In practice, the overall quality of SWCNT is obtained by calculating the G to D band ratio. The higher the ratio, the higher is the quality of SWCNT. The G band can also be used to gauge the efficacy of a particular chemical functionalization process. This is usually approached by comparing the SWCNT spectra before and after chemical functionalization. Thus, when comparing the before and after spectra, the G to D ratio will be decreasing as the degree of chemical modification increases. The G band can also give important information about the electronic properties of SWCNT. The SWCNT can be either metallic or semiconducting in behavior. Common synthetic methods for preparing SWCNT yield a mixture of semiconductor and metallic SWCNT in a 2:1 ratio, respectively. Many applications require separation and/or purification of these two fractions and Raman spectroscopy provides a means to gauge the efficacy of the separation process. The G band shape and width will differ between the semiconducting SWCNT and the metallic SWCNT with the metallic SWCNT represented by a significantly broader G band. For device fabrication, such as building a field effect transistor, it is imperative to incorporate only semiconductor SWCNTs into the device, otherwise any metallic SWCNTs will short out the device.

SWCNTs are also being used in conjunction with other materials to engineer nanodevices and nanomaterials with desired properties. Raman spectroscopy provides detailed information about the quality, purity, homogeneity, and physical, chemical, and electronic properties. Overall, information prior to XPS analysis (such as relative amounts of $sp^2$ and $sp^3$ carbon composition or chemical composition analysis described below) is critical for locating the correct sample location, and saves valuable instrument time by pre-screening the quality and nature of carbon nanotube samples. With accurate alignment of the Raman excitation laser source and X-ray beam, the XPS analysis of the feature can then be performed immediately after Raman analysis without the necessity to acquire an XPS map of the whole sample. This represents a significant saving in time and improved ease of use.

Figure 6A:
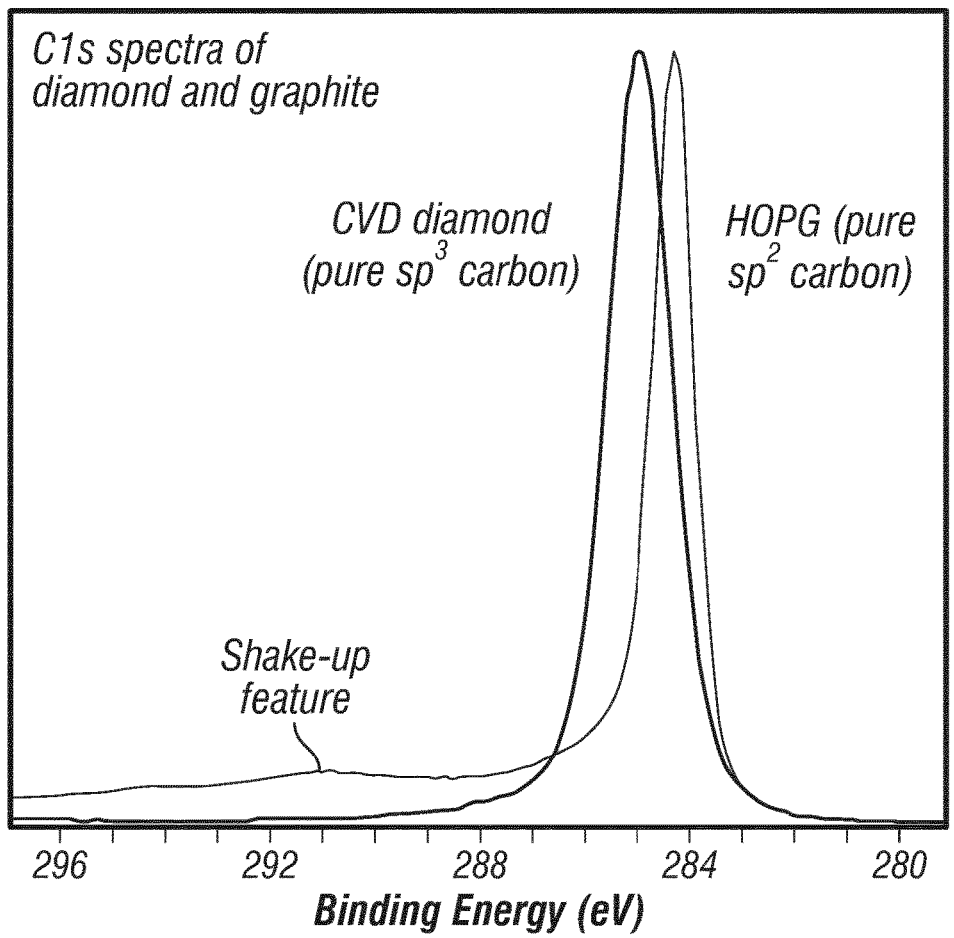
Figure 6D:
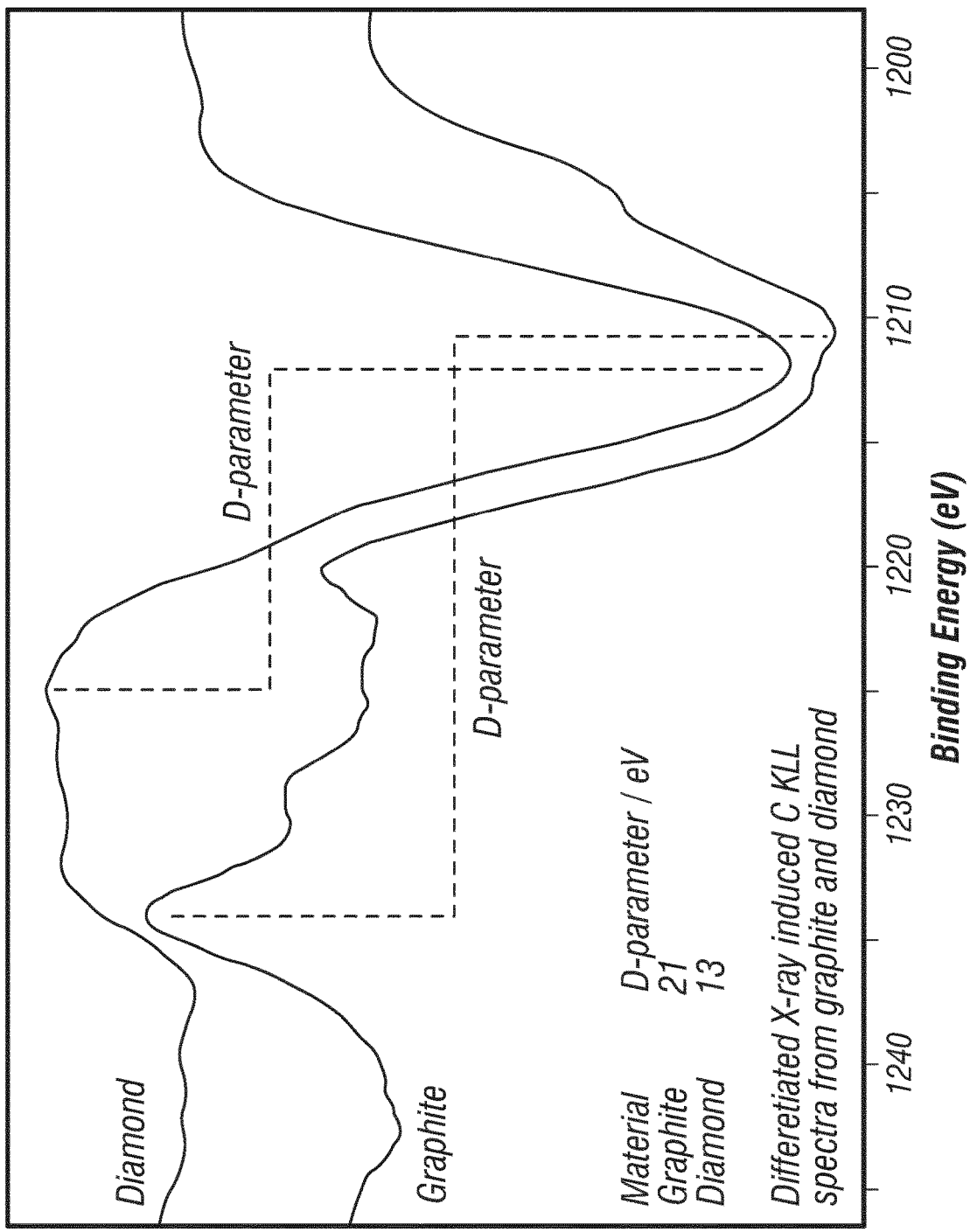

In an XPS analysis, as shown in FIG. 6A, the C1s spectrum from a sample with a high concentration of $sp^2$ carbon has a broad, asymmetric tail toward higher binding energy. One or more satellite features, several eV from the main C1s peak, are also observed in samples with high $sp^2$ concentrations, such as the highly ordered pyrolytic graphite (HOPG) shown in FIG. 6A. For high concentrations of $sp^3$-bonded carbon, the C1s peak has a more symmetric shape and is also slightly shifted to higher binding energy. As shown in FIG. 6B, functionalized graphene (e.g., graphene oxide) has a complex C1s spectrum, containing $sp^2$ and $sp^3$ components, whereas the C1s spectrum of graphene can be fit with the $sp^2$ component with asymmetric shape, as shown in FIG. 6C. As shown in FIG. 6D, the D-parameter gives an indication of relative amounts of $sp^2$ and $sp^3$ carbon. See S. Turgeon, R. W. Paynter, Thin Solid Films 394 (2001) p. 4448, the disclosure of which is hereby incorporated by reference in its entirety (however, where anything in the incorporated reference contradicts anything stated in the present application, the present application prevails). The D-parameter is measured by collecting the carbon KLL Auger spectrum (Auger electron emission is one process by which an atom can fill the electron shell core hole following photoemission), and determining the energy difference between the peak and trough of the first differential of the feature. The C KLL Auger feature is sensitive to the bonding environment, and the D-parameter can be used as a semi-quantitative measure of the $sp^2/sp^3$ content of a sample. A lower value, typically around 10 eV, is characteristic of high $sp^3$ content, whereas a higher value closer to 25 eV indicates a predominance of $sp^2$ content, as shown in FIG. 6D, for graphite (21 eV) and diamond (13 eV). For samples with a large amount of heteroatom functionalization, the D-parameter can be an easier way of determining the $sp^2/sp^3$ ratio. From this it can be seen that the XPS analysis can measure not only photoelectrons but also Auger electrons that are emitted from the sample surface as a result of irradiation by the X-rays.

An additional benefit of combined Raman/XPS analysis is that samples can be analyzed that are transparent to visible optical microscopes but differ in chemical composition. The Raman spectral information can point the XPS user to areas on the sample that offer the most interesting chemistry. While the above examples are based on carbon nanotubes, this can also be applied to graphene, silicon carbide and other carbon based materials.

In another embodiment, a process of analyzing surface layers using Raman spectroscopy and X-ray photoelectron spectroscopy (XPS) includes providing a sample having a sample surface within a vacuum chamber, the sample surface comprising a surface layer on a substrate, performing a Raman spectroscopic analysis on a selected area of the sample surface comprising the surface layer on the substrate within the vacuum chamber, bombarding the selected area of the sample surface with ions in one or more stages to remove the surface layer from the selected area, performing an XPS analysis on the selected area of the sample surface after each of the one or more stages of bombarding the selected area of the sample surface with ions to determine if the surface layer has been removed, performing a Raman spectroscopic analysis on the selected area of the sample surface after the surface layer has been removed as determined by the XPS analysis, and determining a difference between results of the Raman spectroscopic analysis before the surface layer has been removed and results of the Raman spectroscopic analysis after the surface layer has been removed. The term surface layer herein refers to any thin films or surface layers to be analysed. For example, the surface layer could be a thin film deposited or prepared on the surface, or a surface composition that has been exposed from the bulk of the sample. The process can further include no longer bombarding the selected area of the sample surface with ions after the XPS analysis indicates that the surface layer has been removed. In some embodiments, the process can further include (i) subtracting results of the Raman spectroscopic analysis after the surface layer has been removed from results of the Raman spectroscopic analysis before the surface layer has been removed, or (ii) subtracting results of the Raman spectroscopic analysis before the surface layer has been removed from results of the Raman spectroscopic analysis after the surface layer has been removed. In certain embodiments, the ions can be cluster ions, such as argon cluster ions. In some embodiments, a laser beam spot for the Raman spectroscopic analysis and an X-ray beam spot for the XPS analysis can be substantially co-aligned at the sample surface. In these embodiments, the laser beam spot for the Raman spectroscopic analysis and the X-ray beam spot for the XPS analysis can be each less than about 20 microns, such as less than about 15 microns, in diameter at the sample surface.

XPS systems typically include a capability for ion beam sputtering, both for cleaning the surface of the sample and for depth-profiling below the surface. This feature is not available on Raman spectrometers. By providing such a sample cleaning capability on this platform the quality of the Raman data can be significantly improved, for example by removing surface contaminants that contribute fluorescence artifacts in the acquired Raman spectrum. The cleaning process can be monitored using XPS, to ensure that only surface contaminants are removed, and that the underlying sample chemistry is not being altered. This feature is particularly beneficial if a cluster ion source is used rather than a monatomic ion source, as the sample damage caused by the ion beam is significantly reduced with cluster ion sources. Suitable cluster ions sources are described in PCT Application No. PCT/EP2011/067626 of Barnard, published as WO 2012/049110 A2 on Apr. 19, 2012, the disclosure of which is hereby incorporated by reference in its entirety (however, where anything in the incorporated reference contradicts anything stated in the present application, the present application prevails).

Figure 7:
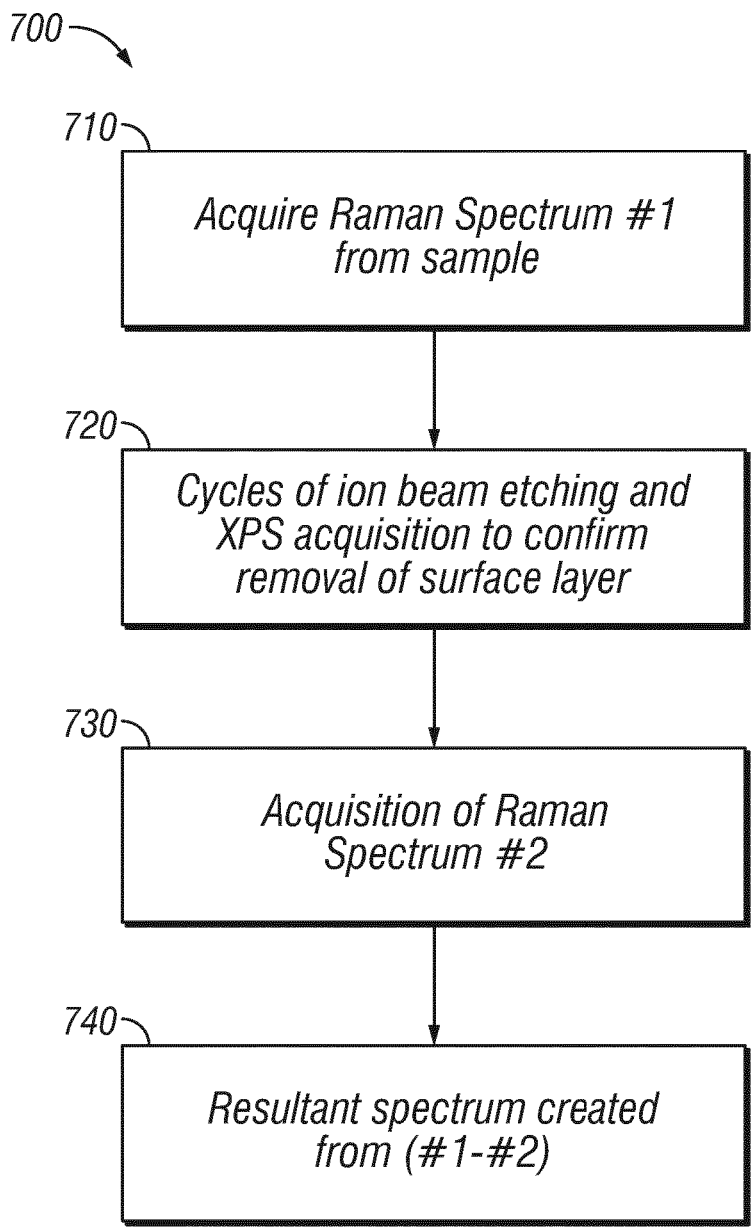
FIG. 7 is a flowchart of an exemplary method of obtaining a spectrum of a surface layer.
Figure 8:
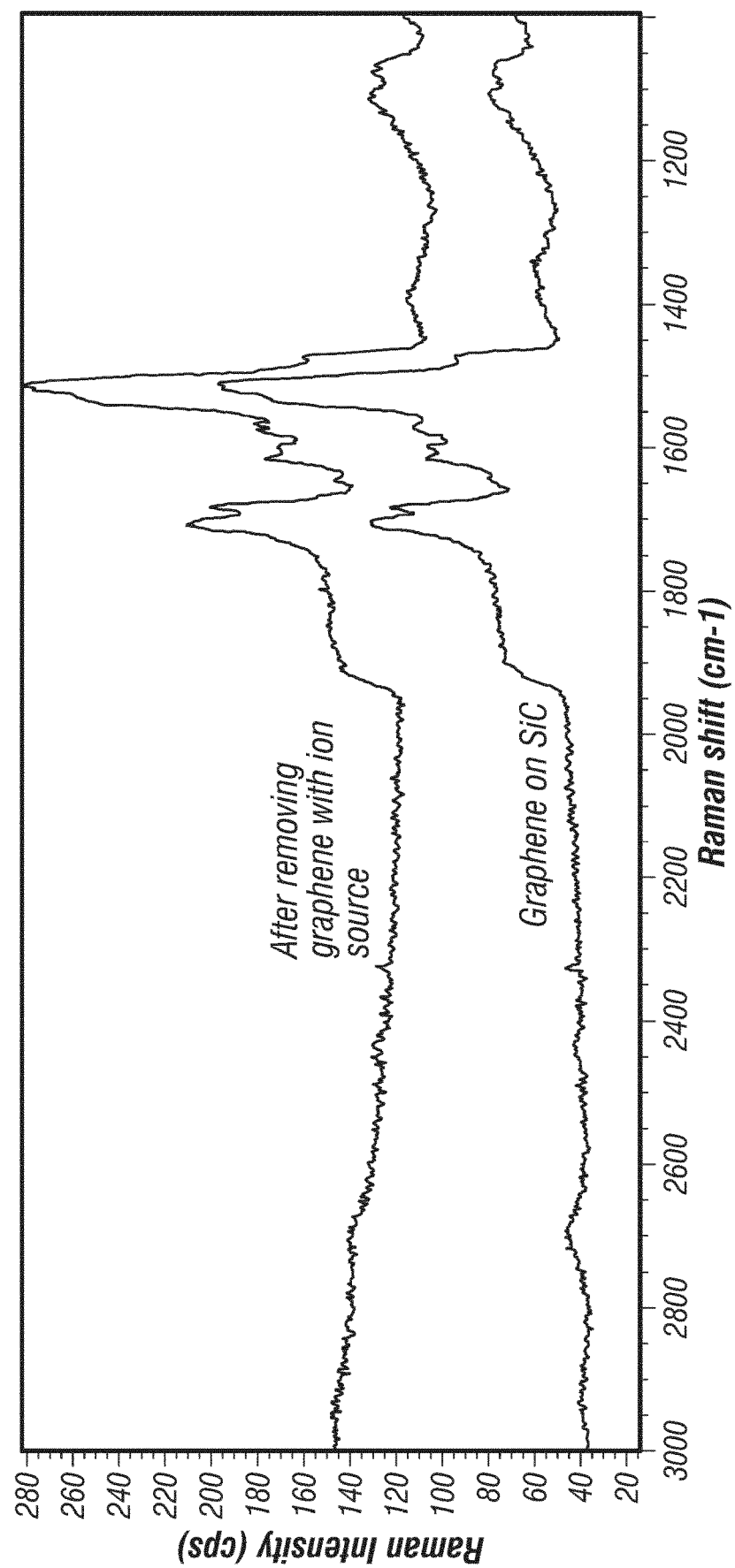
FIG. 8 shows exemplary Raman spectra of graphene on SiC. The lower spectrum is the spectrum of the sample with the graphene layer intact, and the upper spectrum is the spectrum obtained after using the cluster ion beam to remove the graphene layer. The removal of the graphene layer was monitored using the C1s XPS spectrum.
Figure 9:
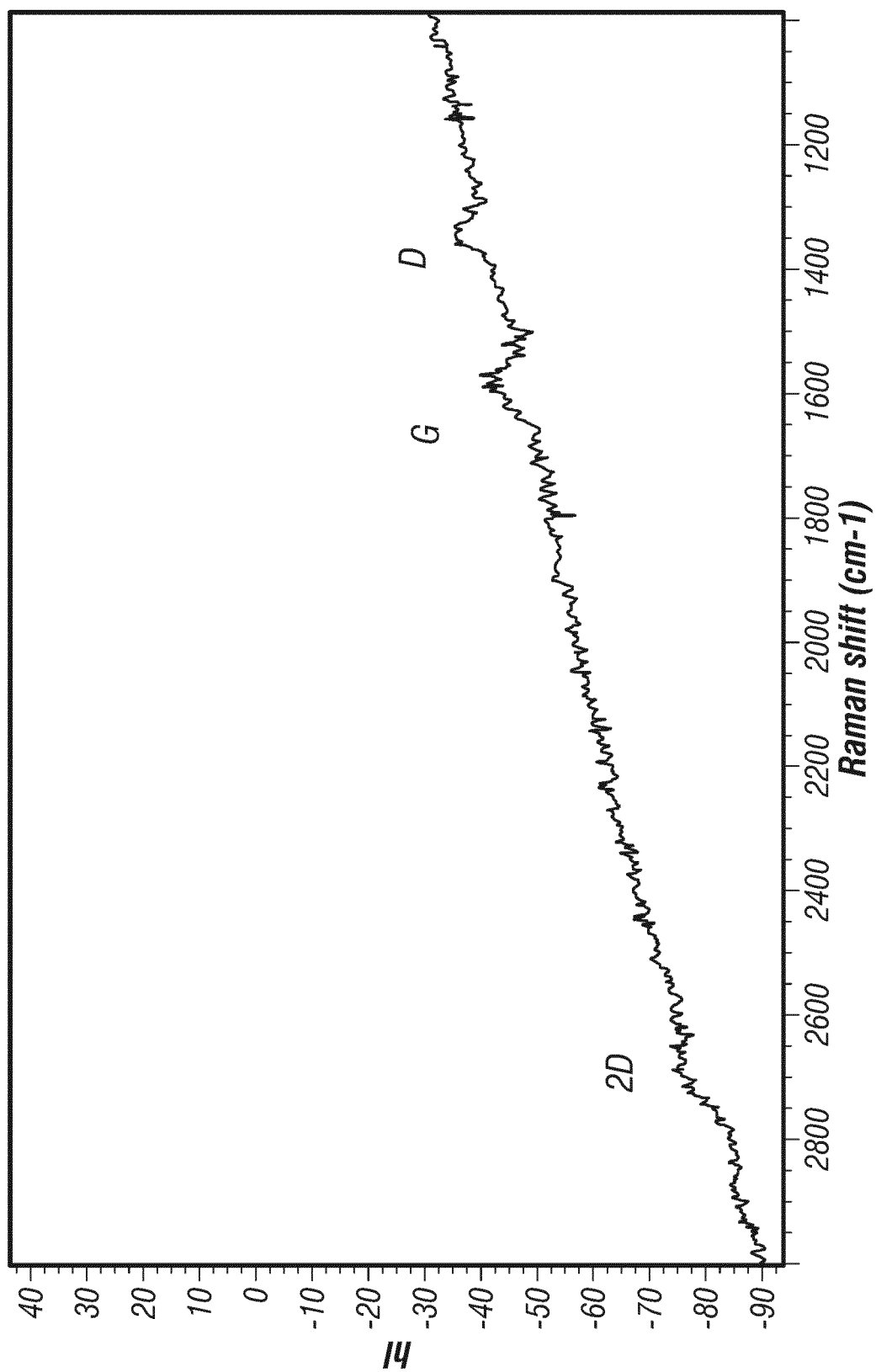
FIG. 9 shows the Raman spectrum resulting from subtraction of the upper spectrum from the lower spectrum shown in FIG. 8. The G, D, and 2D bands of graphene are evident in FIG. 9, while they were originally masked by the SiC spectrum in FIG. 8.

In samples where a thin surface layer has been deposited, it may be impossible to decouple the resultant Raman spectrum from that of the substrate material. As shown in FIG. 7, XPS and the ion beam can be used to remove the thin surface layer at step 720 following acquisition of a Raman spectrum at step 710, stopping when XPS confirms that the surface layer has been removed, as shown in FIG. 8. A second Raman spectrum may then be collected at step 730, and subtracted from the original spectrum at step 740 to yield a result that is representative of only the surface layer, as shown in FIG. 9.

The method 700 described above can be implemented on any system incorporating XPS, ion beam etching and Raman spectroscopy. Again, the use of a cluster ion beam source rather than a monatomic ion beam source is preferred for the reasons described above.

In yet another embodiment, a process of analyzing a sample by Raman spectroscopy includes providing a sample to be analyzed, the sample having a sample surface to which a protective layer has been added to protect the surface from the atmosphere, for example at least one component of air. The process may analyze a sample that has been already protected in this way or it may include the step of preparing a sample to be analyzed, the sample having a sample surface, by adding a protective layer to the sample surface to protect the surface from at least one component of air. The process continues by positioning the sample having the protective layer in a vacuum chamber, bombarding the sample surface in the vacuum chamber with ions to remove the protective layer from at least one selected area of the sample surface, and performing a Raman spectroscopic analysis on the at least one selected area of the sample surface from which the protective layer has been removed. The process can further include performing an XPS analysis on the at least selected area of the sample surface after one or more stages of bombarding the at least one selected area of the sample surface with ions to determine if the protective layer has been removed. In these embodiments, the process can further include stopping bombarding the at least one selected area of the sample surface with ions when the XPS analysis indicates that the protective layer has been removed. The at least one component of air can be oxygen or water. In some embodiments, the ions can be cluster ions. The protective layer can include metals, metal oxides, polymers, semiconductors, metal nitrides, silicon compounds, diamond, and diamond-like carbon.

In samples which are affected by exposure to air (for example due to reaction with one or more components of air such as oxygen or water vapor), it is often necessary to add protective capping layers during sample preparation. Conventional Raman analysis may then not be feasible. The capability to remove this protective layer using ion beam etching enables Raman analysis to be performed where it was not possible before.

This method can be implemented on any system incorporating both ion beam etching and Raman spectroscopy, and, optionally, XPS. Again, the use of a cluster ion beam source rather than a monatomic ion beam source is preferred for the reasons described above.

In still another embodiment, a process of analyzing a sample surface by Raman spectroscopy and X-ray photoelectron spectroscopy (XPS) includes providing a sample having a sample surface within a vacuum chamber, performing a Raman spectroscopic analysis on at least one selected area of the sample surface within the vacuum chamber to provide Raman spectroscopic results, performing an XPS analysis of the at least one selected area of the sample surface within the vacuum chamber to provide XPS analysis results, and performing multivariate statistical analysis of the Raman spectroscopic results and XPS analysis results to identify chemical and/or structural features of the sample surface. The multivariate statistical analysis can include principal components analysis (PCA). In some embodiments, the process can further include combining the Raman spectroscopic results and XPS analysis results and performing the multivariate statistical analysis on the combined results. In certain embodiments, the process can further include performing multivariate statistical analysis of the Raman spectroscopic results to identify one or more Raman phases comprising chemical and/or structural phases, and performing multivariate statistical analysis of the XPS analysis results to identify one or more XPS phases comprising chemical and/or structural phases. In these embodiments, the process can further include correlating or performing multivariate statistical analysis of the identified one or more Raman phases and one or more XPS phases. In some embodiments, the Raman spectroscopic analysis and XPS analysis can be performed simultaneously. In some other embodiments, the Raman spectroscopic analysis and XPS analysis can be performed sequentially. In certain embodiments, the Raman spectroscopic analysis and XPS analysis can be performed with similar, or substantially the same, spatial resolution. In these embodiments, a laser beam spot for the Raman spectroscopic analysis and an X-ray beam spot for the XPS analysis can be substantially co-aligned at the sample surface. The laser beam spot for the Raman spectroscopic analysis and the X-ray beam spot for the XPS analysis can be each less than about 20 microns, such as less than about 15 microns, in diameter at the sample surface. In some embodiments, the process can further include repeating each of the Raman spectroscopic analysis and XPS analysis at a plurality of selected areas of the sample surface to obtain an image of chemical and/or structural features of the sample surface identified by the multivariate statistical analysis. In certain embodiments, the process can further include translating the sample stage to perform each of the Raman spectroscopic analysis and XPS analysis at a plurality of selected areas of the sample surface.

Advanced data and image multivariate statistical analysis techniques such as principal component analysis (PCA) are widely available for the analysis of both Raman and XPS data. The simultaneous acquisition of such data from a single sample, using techniques of similar spatial resolution and with precise image registration and scaling offers a method for more powerful data analysis than was possible with individual data sets.

Figure 10:
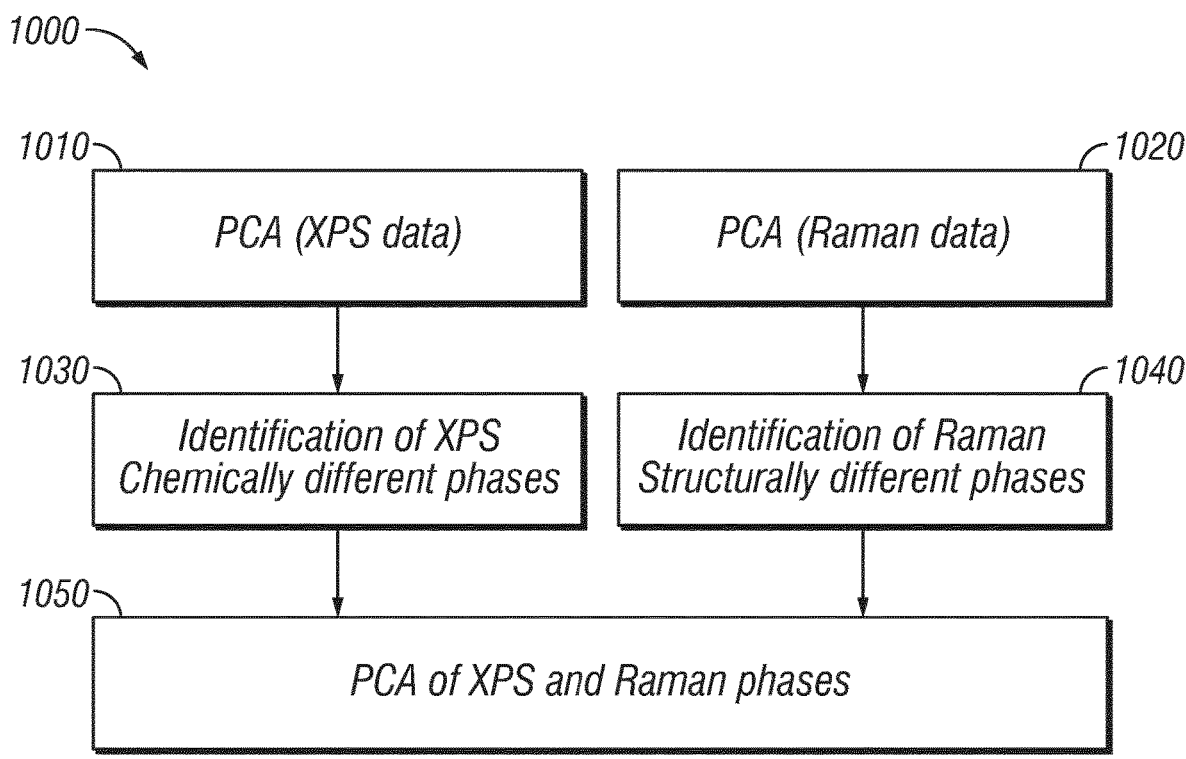
FIG. 10 is a flowchart of a method of performing multivariate statistical analysis on XPS and Raman data sets.
Figure 11:
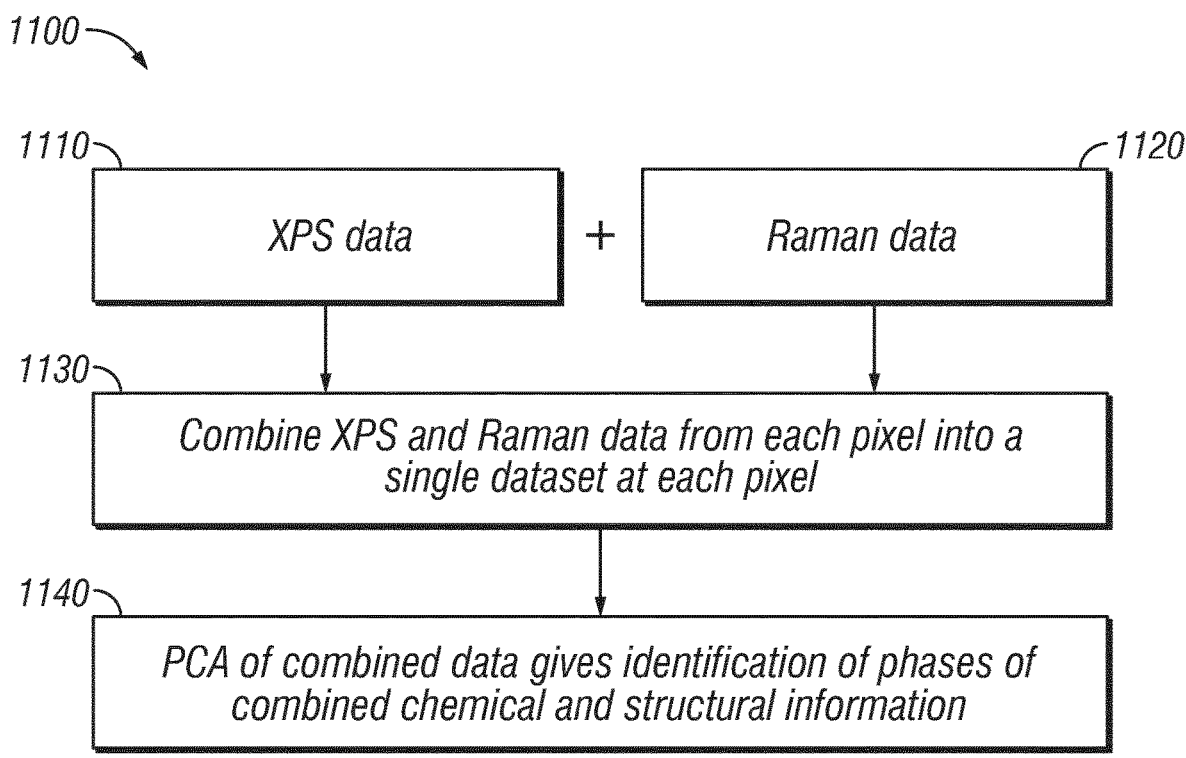
FIG. 11 is a flowchart of a method of performing multivariate statistical analysis on combined XPS and Raman data set.

The use of combined XPS and Raman data sets with appropriate data pre-processing (scaling and normalization) with these PCA analysis techniques provides the capability to correlate chemical (XPS) and structural (Raman) information to provide a more complete analysis and identification of materials present. This correlation can be done either individually with data from each technique as shown in FIG. 10, or as a combined data set as shown in FIG. 11. Turning to FIG. 10, a process 1000 of analyzing a sample surface includes performing PCA on XPS data at step 1010, performing PCA on Raman data at step 1020, identifying XPS chemically different phases at step 1030, identifying Raman structurally different phases at step 1040, and performing PCA on the XPS and Raman phases at step 1050. Alternatively or additionally, as shown in FIG. 11, a process 1100 of analyzing a sample surface includes combining XPS data 1110 with Raman data 1120 into a single data set at each pixel at step 1130, and performing PCA on the combined data set at step 1140.

Figure 12:
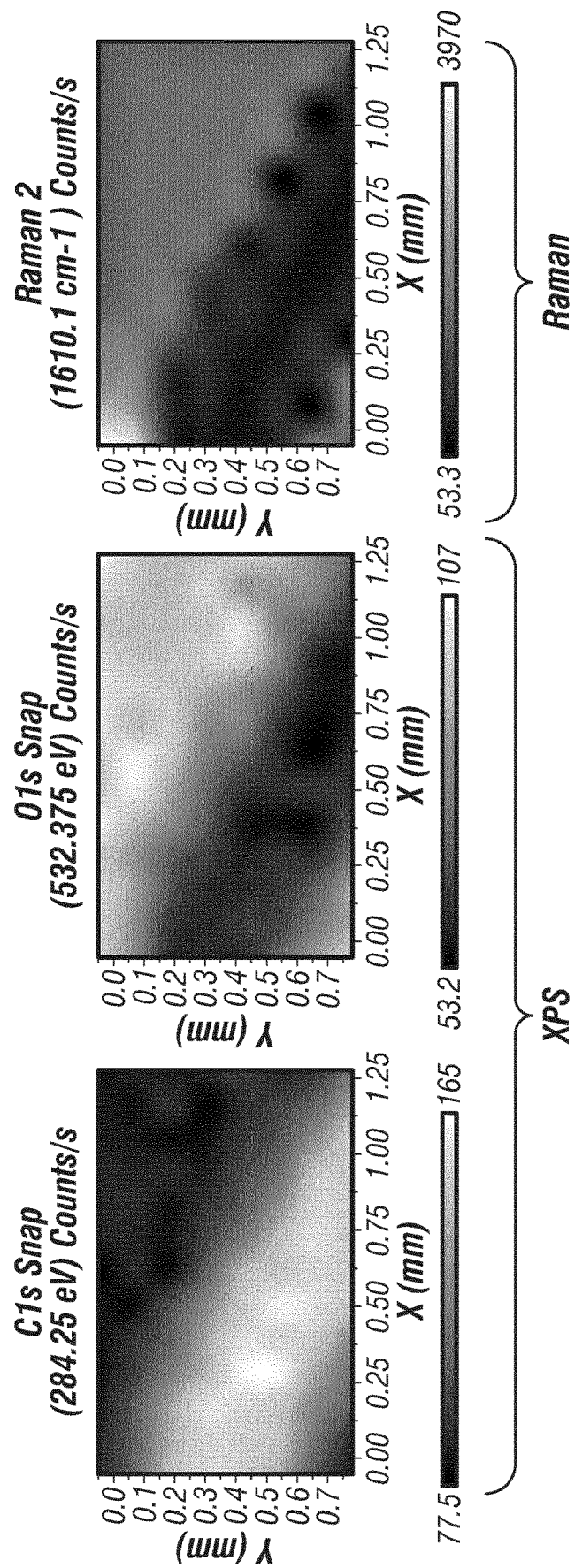
FIG. 12 is an illustration of XPS and Raman maps collected during the same experiment from a polyethylene terephthalate (PET) sample marked with ink. Data was collected for both XPS and Raman at each pixel in a serial acquisition mode.
Figure 13:
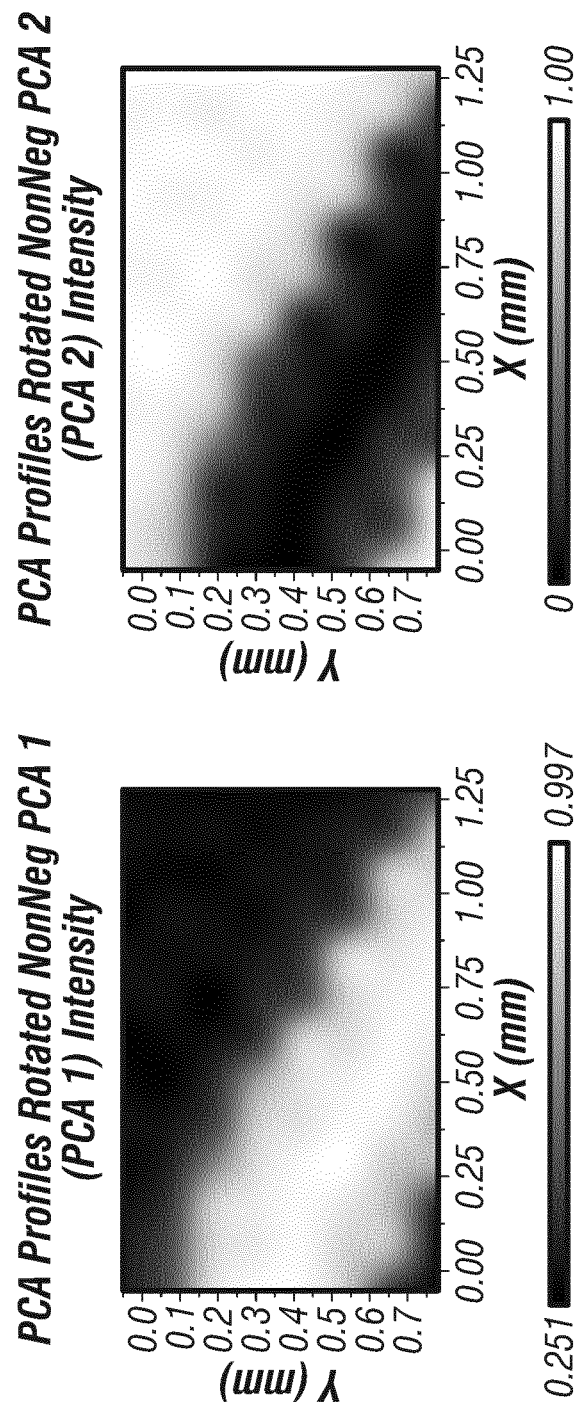
FIG. 13 is an illustration of PCA analysis of the complete data set (Raman and XPS) that identified two main components, associated with the PET and ink areas.
Figure 14:
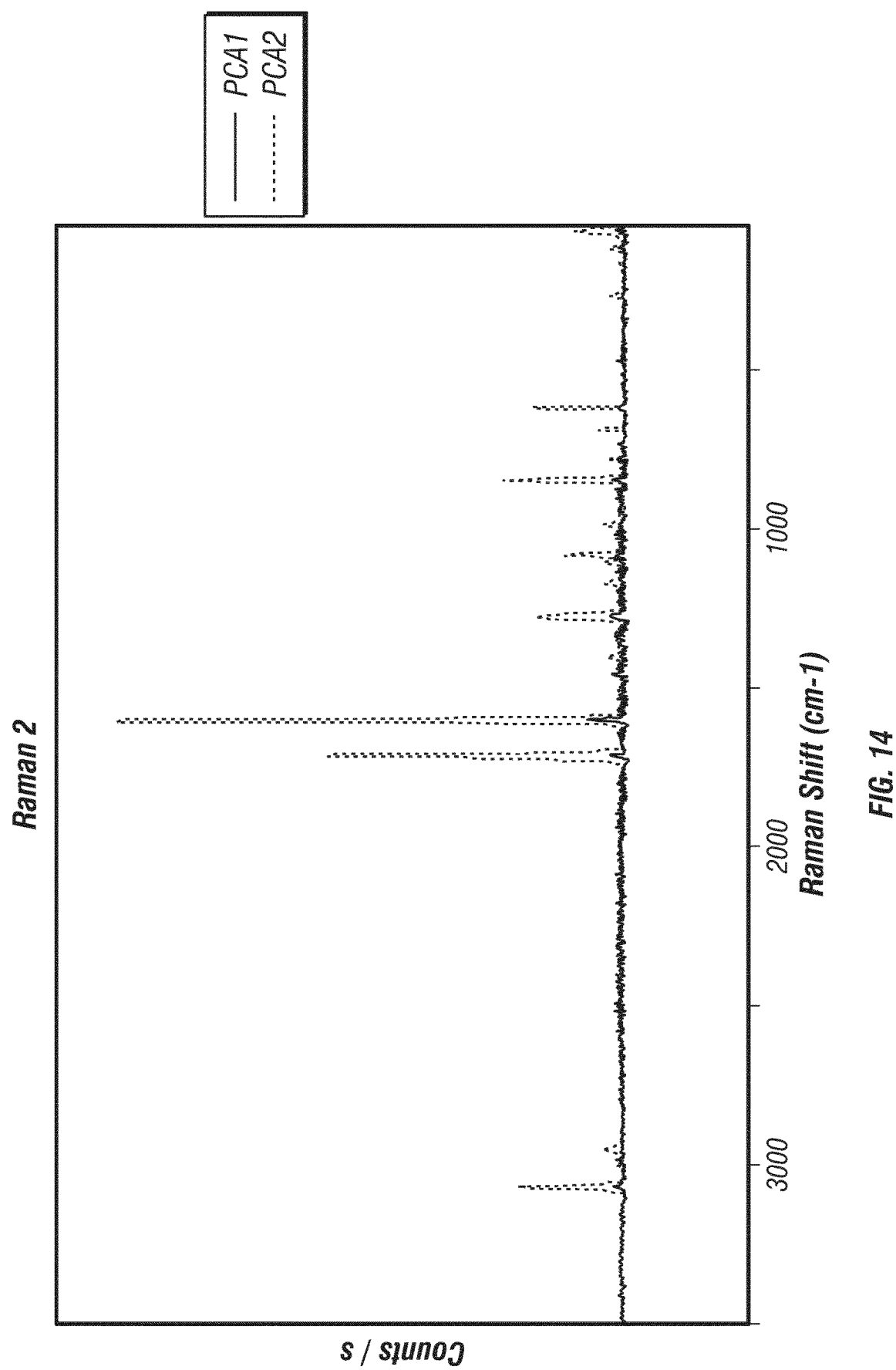
FIG. 14 is an illustration of the Raman spectra of the two main components, associated with the PET (dashed line) and ink (solid line) areas, extracted from the data set.
Figure 15B:
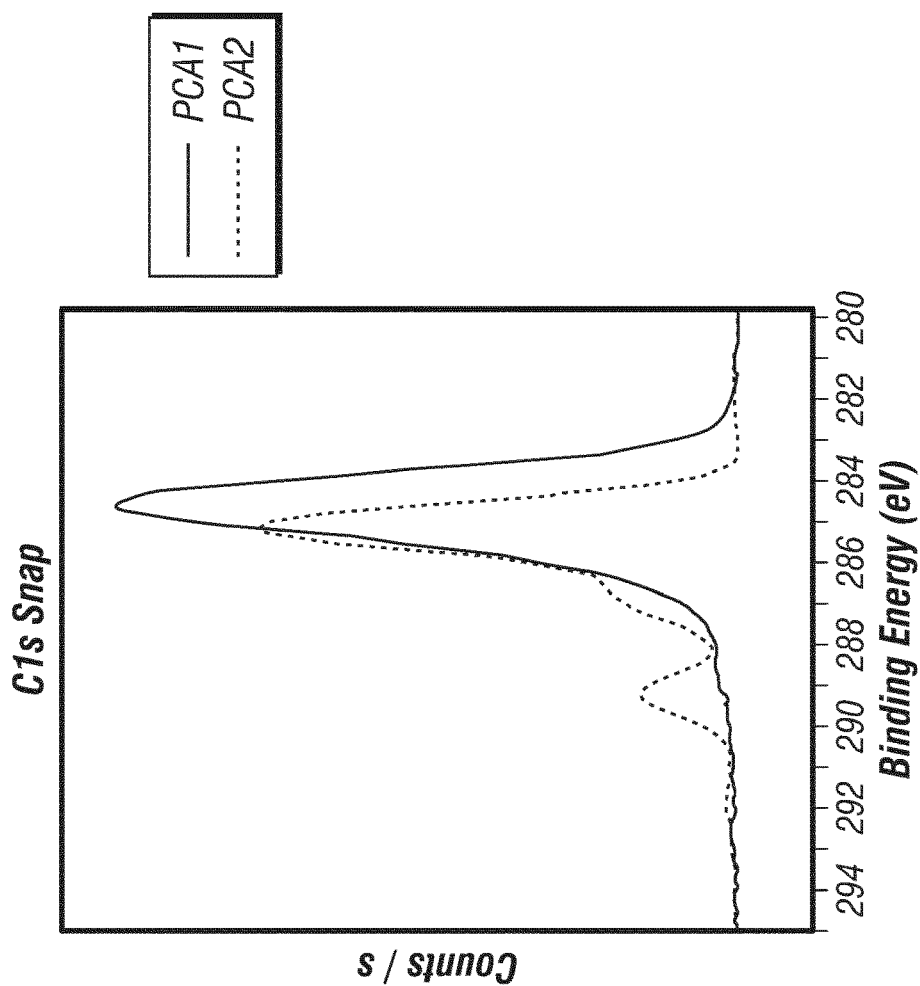
FIGS. 15A and 15B are illustrations of the XPS spectra of the two main components, associated with the PET (dashed line) and ink (solid line) areas, extracted from the data set.
Figure 15A:
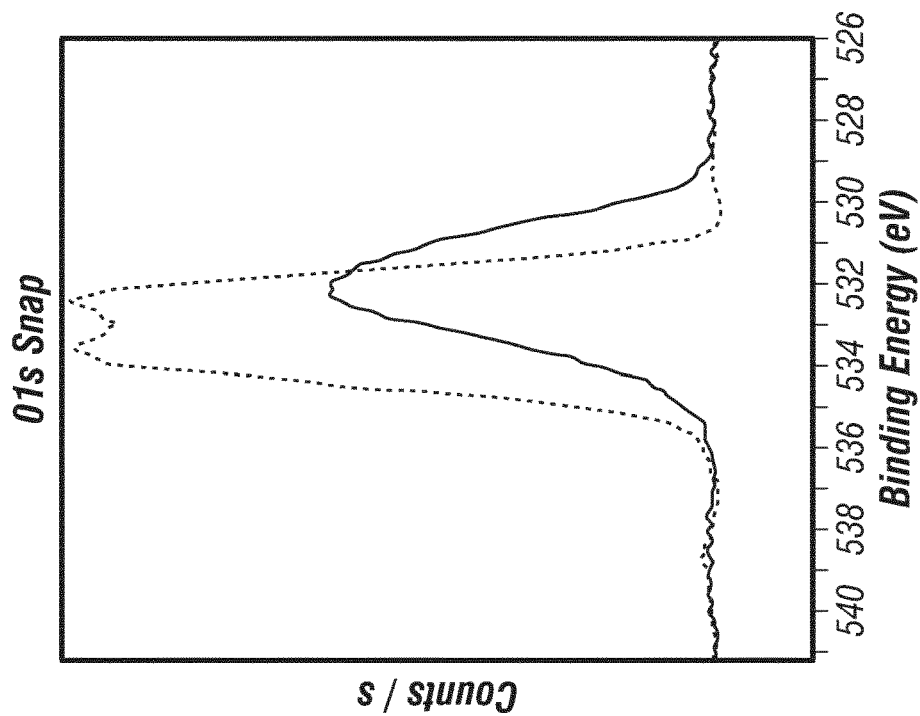

As an example, a sample of polyethylene terephthalate (PET) was marked with ink. This was mapped using the combined XPS-Raman system, collecting both XPS (C1s and O1s signals) and Raman spectra (Raman 2 signal, 1610.1 $cm^{-1}$) simultaneously at each position, as shown in FIG. 12. The resulting dataset was then processed using PCA, with the Raman and XPS data at each position combined as the input into the PCA algorithm. The output identifies the two areas on the sample, as shown in FIG. 13, and enables extraction of two components representative of the two chemistries present (ink and PET) as illustrated in FIG. 14 showing the Raman spectra of the two components, and FIGS. 15A and 15B, showing the XPS spectra of the two components.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An X-ray photoelectron spectroscopy (XPS) and Raman spectroscopy alignment system comprising:
    (a) a vacuum chamber;
    (b) a sample stage mounted within the vacuum chamber;
    (c) a Raman spectrometer having a Raman laser for providing a Raman laser beam;
    (d) a Raman laser transfer optical assembly mounted within the vacuum chamber and configured to focus a Raman laser beam from the Raman spectrometer on a selected area on the sample stage;
    (e) a video camera mounted outside the vacuum chamber and configured to provide images of the sample stage;
    (f) an X-ray source mounted within the vacuum chamber and configured to direct X-rays toward the same selected area of the sample stage; and
    (g) an X-ray alignment indicator mounted on the sample stage that provides a visual indication of X-ray location viewable by the video camera on the sample stage in response to X-rays directed toward the sample stage;
    (h) an X-ray location for the X-rays and a laser beam location for the Raman laser beam on the sample stage configured to be substantially the same size and each less than about 20 microns in diameter; and
    (i) a position of the Raman laser beam configured to be adjustable in X and Y directions of an X-Y plane, such that the laser beam location can be aligned with the X-ray location on the sample stage, wherein the adjustable position of the Raman laser beam is provided by the Raman spectrometer being mounted on a base plate that is mounted on the vacuum chamber, the base plate being adjustable in the X and Y directions of the X-Y plane, or by at least two kinematic mirrors located outside of the Raman spectrometer.

2. The alignment system of claim 1, wherein the video camera is configured to provide images of the sample stage through a window on the vacuum chamber.

3. The alignment system of claim 1, wherein the X-ray location and the Raman laser beam location on the sample stage are each less than or equal to about 15 µm in diameter.

4. The alignment system of claim 1, wherein an alignment tolerance between the Raman laser beam location and X-ray location is less than about 10 µm.

5. The alignment system of claim 4, wherein the alignment tolerance between the Raman laser beam location and X-ray location is less than about 5 µm.

6. The alignment system of claim 1, wherein the Raman laser transfer optical assembly includes standard antireflection coated optics.

7. The alignment system of claim 1, wherein the X-ray alignment indicator comprises a phosphorescent material that is sensitive to the X-rays.

8. The alignment system of claim 1, wherein the Raman spectrometer comprises a spectrograph for receiving Raman scattered light from the sample stage along a scattered light path and directing the received Raman scattered light to a Raman detector, and wherein the Raman spectrometer comprises adjustment optics for adjusting the laser beam in order to maximize the intensity of the scattered light at the detector.

9. The alignment system of claim 1, wherein the Raman laser beam location and X-ray location are substantially coincident.

10. A method of aligning an X-ray photoelectron spectroscopy (XPS) system and a Raman spectroscopy system, the method comprising:
    (a) directing X-rays toward a sample stage within a vacuum chamber;
    (b) focusing a Raman laser beam from a Raman spectrometer on the sample stage;
    (c) viewing an X-ray alignment indicator mounted on the sample stage within the vacuum chamber;
    (d) directing X-rays toward a selected area on the X-ray alignment indicator that provides a visual indication of X-ray location on the sample stage in response to the X-rays;
    (e) focusing the Raman laser beam on the same selected area, wherein an X-ray location for the X-rays and a laser beam location for the Raman laser beam on the sample stage are configured to be substantially the same size and each less than about 20 microns in diameter; and
    (f) adjusting the position of the Raman laser beam in X and Y directions of an X-Y plane to align the laser beam location with the X-ray location on the sample stage, wherein the adjustable position of the Raman laser beam is provided by the Raman spectrometer being mounted on a base plate that is mounted on the vacuum chamber, the base plate being adjustable in the X and Y directions of the X-Y plane, or by at least two kinematic mirrors located outside of the Raman spectrometer.

11. The method of claim 10, wherein focusing the Raman laser beam includes focusing on a Raman focus indicator mounted on the sample stage that provides a Raman spectrum in response to the Raman laser beam.

12. The method of claim 11, wherein the Raman focus indicator comprises silicon.

13. The method of claim 11, wherein the Raman focus indicator comprises lithium niobate.

14. The method of claim 10, wherein the X-ray alignment indicator comprises a phosphorescent material that is sensitive to the X-rays.

15. The method of claim 10, wherein the Raman laser beam location and X-ray location are aligned with a tolerance less than about 10 μm.

16. The method of claim 15, wherein the Raman laser beam location and X-ray location are aligned with a tolerance less than about 5 μm.

* * * * *